(12) United States Patent
Kraft et al.

(10) Patent No.: US 9,765,693 B2
(45) Date of Patent: Sep. 19, 2017

(54) GAS TURBINE AIR INJECTION SYSTEM CONTROL AND METHOD OF OPERATION

(71) Applicant: PowerPHASE LLC, Jupiter, FL (US)

(72) Inventors: Robert J. Kraft, Tequesta, FL (US); Scott Auerbach, Jupiter, FL (US)

(73) Assignee: POWERPHASE LLC, Jupiter, FL (US)

( * ) Notice: Subject to any disclaimer, the term of this patent is extended or adjusted under 35 U.S.C. 154(b) by 448 days.

(21) Appl. No.: 14/329,433

(22) Filed: Jul. 11, 2014

(65) Prior Publication Data

US 2014/0373551 A1 Dec. 25, 2014

Related U.S. Application Data

(63) Continuation-in-part of application No. 14/350,469, filed as application No. PCT/US2013/034748 on Mar. 31, 2013.

(Continued)

(51) Int. Cl.

| | |
|---|---|
| *F02C 7/08* | (2006.01) |
| *F02C 7/10* | (2006.01) |
| *F02C 6/14* | (2006.01) |
| *F01K 23/10* | (2006.01) |
| *F01K 23/02* | (2006.01) |
| *F02C 6/16* | (2006.01) |

(Continued)

(52) U.S. Cl.
CPC .............. *F02C 7/08* (2013.01); *F01K 23/02* (2013.01); *F01K 23/10* (2013.01); *F02C 6/16* (2013.01); *F02C 7/10* (2013.01); *F02C 7/143* (2013.01); *F02C 9/16* (2013.01); *F02C 9/28* (2013.01); *F05D 2260/42* (2013.01); *Y02E 20/16* (2013.01); *Y02E 60/15* (2013.01)

(58) Field of Classification Search
CPC ...... F02C 6/04; F02C 6/06; F02C 6/08; F02C 6/16; F02C 7/08; F02C 7/10; F02C 7/105; F01K 23/00; F01K 23/02; F01K 23/10

See application file for complete search history.

(56) References Cited

U.S. PATENT DOCUMENTS

| | | | |
|---|---|---|---|
| 3,359,723 | A | 12/1967 | Bohensky et al. |
| 3,722,218 | A | 3/1973 | Lapera |

(Continued)

FOREIGN PATENT DOCUMENTS

| | | |
|---|---|---|
| GB | 776269 | 6/1957 |
| WO | 2013151909 A1 | 10/2013 |

OTHER PUBLICATIONS

Office Action dated Sep. 20, 2016, corresponding the U.S. Appl. No. 14/350,469.

(Continued)

*Primary Examiner* — Pascal M Bui Pho
*Assistant Examiner* — Rene Ford
(74) *Attorney, Agent, or Firm* — Lathrop Gage LLP

(57) ABSTRACT

The present invention discloses a novel apparatus and methods for controlling an air injection system for augmenting the power of a gas turbine engine, improving gas turbine engine operation, and reducing the response time necessary to meet changing demands of a power plant. Improvements in control of the air injection system include ways directed towards preheating the air injection system, including using an gas turbine components, such as an inlet bleed heat system to aid in the preheating process.

16 Claims, 15 Drawing Sheets

Related U.S. Application Data

(60) Provisional application No. 61/686,222, filed on Apr. 2, 2012.

(51) Int. Cl.
| | | |
|---|---|---|
| *F02C 9/28* | (2006.01) | |
| *F02C 7/143* | (2006.01) | |
| *F02C 9/16* | (2006.01) | |

(56) References Cited

U.S. PATENT DOCUMENTS

| | | | |
|---|---|---|---|
| 3,831,373 A | 8/1974 | Flynt | |
| 5,722,241 A * | 3/1998 | Huber | F04D 29/5826 |
| | | | 415/114 |
| 5,778,675 A | 7/1998 | Nakhamkin | |
| 5,845,481 A | 12/1998 | Briesch et al. | |
| 5,934,063 A | 8/1999 | Nakhamkin et al. | |
| 6,027,304 A * | 2/2000 | Arar | F02C 7/045 |
| | | | 415/116 |
| 6,212,871 B1 | 4/2001 | Rakhmailov | |
| 6,244,037 B1 | 6/2001 | Nakhamkin et al. | |
| 6,250,064 B1 * | 6/2001 | Tomlinson | F01K 21/047 |
| | | | 60/775 |
| 6,305,158 B1 | 10/2001 | Nakhamkin et al. | |
| 6,481,212 B2 | 11/2002 | Priestley | |
| 6,487,863 B1 * | 12/2002 | Chen | F02C 6/08 |
| | | | 60/39.12 |
| 6,499,303 B1 | 12/2002 | Polukort et al. | |
| 6,526,758 B2 | 3/2003 | Ranasinghe et al. | |
| 7,147,050 B2 | 12/2006 | Kang et al. | |
| 8,458,658 B2 | 6/2013 | Faus et al. | |
| 8,616,005 B1 | 12/2013 | Cousino, Sr. | |
| 9,388,737 B2 | 7/2016 | Kraft | |
| 2001/0000091 A1 | 4/2001 | Nakhamkin et al. | |
| 2001/0022078 A1 * | 9/2001 | Horii | F02C 7/1435 |
| | | | 60/39.182 |
| 2001/0032450 A1 * | 10/2001 | Little | F02C 1/00 |
| | | | 60/772 |
| 2002/0083712 A1 | 7/2002 | Tomlinson | |
| 2005/0067330 A1 | 3/2005 | Berlin | |
| 2009/0200805 A1 | 8/2009 | Kim et al. | |
| 2011/0005228 A1 | 1/2011 | Yoshinari et al. | |
| 2011/0162383 A1 * | 7/2011 | Zhang | F01D 25/30 |
| | | | 60/782 |
| 2011/0181050 A1 | 7/2011 | Dinu | |
| 2011/0265443 A1 * | 11/2011 | Ansari | F02C 7/057 |
| | | | 60/39.23 |
| 2013/0000321 A1 * | 1/2013 | Arar | F02C 6/08 |
| | | | 60/785 |
| 2013/0001948 A1 * | 1/2013 | Lim | F02C 6/16 |
| | | | 290/52 |
| 2013/0125525 A1 | 5/2013 | Hein et al. | |
| 2013/0125557 A1 * | 5/2013 | Scipio | F02C 9/22 |
| | | | 60/773 |
| 2013/0263601 A1 * | 10/2013 | Richardson | F02C 7/04 |
| | | | 60/722 |
| 2014/0083108 A1 * | 3/2014 | Kunihiro | F01K 23/10 |
| | | | 60/772 |
| 2014/0144124 A1 * | 5/2014 | Mazumder | F02C 7/047 |
| | | | 60/39.093 |
| 2014/0250902 A1 | 9/2014 | Kraft | |
| 2014/0260177 A1 * | 9/2014 | Reed | F02C 9/22 |
| | | | 60/39.24 |
| 2014/0321967 A1 * | 10/2014 | Zhang | F02C 7/143 |
| | | | 415/1 |
| 2016/0169105 A1 | 6/2016 | Kraft | |

OTHER PUBLICATIONS

International Search Report with Written Opinion dated Jun. 28, 2013 in Application No. PCT/US2013/034748, 16 pages.
International Preliminary Report on Patentability dated Oct. 7, 2014 in Application No. PCT/US2013/034748, 8 pages.
International Search Report with Written Opinion dated Jan. 28, 2016 in Application No. PCT/US15/22755, 11 pages.
Notice of Allowance dated Mar. 1, 2017, corresponding the U.S. Appl. No. 14/350,469.

* cited by examiner

GAS TURBINE AIR INJECTION SYSTEM CONTROL AND METHOD OF OPERATION

CROSS-REFERENCE TO RELATED APPLICATIONS

This application is a continuation-in-part of U.S. patent application Ser. No. 14/350,469, which claims priority from PCT/US2013/034748, filed on Mar. 31, 2013, which claims priority of U.S. Provisional Patent Application Ser. No. 61/686,222 filed on Apr. 2, 2012.

TECHNICAL FIELD

The invention generally relates to gas turbine engine power systems, including supplementing the generating capacity of such gas turbine engines for use in providing additional electrical power during periods of peak electrical power demand. More specifically, methods of operation to the supplemental generating system are identified.

BACKGROUND OF THE INVENTION

Currently, marginal energy, or peak energy, is produced mainly by gas turbines, operating either in simple cycle or combined cycle configurations. As a result of load demand profile, the gas turbine base systems are cycled up during periods of high demand and cycled down, or turned off, during periods of low demand. This cycling is typically driven by the electrical grid operator under a program called "active grid control", or AGC. Unfortunately, because industrial gas turbines, which represent the majority of the installed power generation base, were designed primarily for base load operation, a severe penalty is associated with the maintenance cost of that particular unit when they are cycled. For example, a gas turbine that is running base load might go through a normal maintenance cycle once every three years, or 24,000 hours of operation, at a cost of between two million dollars and three million dollars ($2,000,000 to $3,000,000). That same cost could be incurred in one year for a gas turbine that is forced to start up and shut down every day due to the severe penalty associated with the maintenance cost of cycling that particular gas turbine. Also, even aero-derivative engines, which are designed for quick starting capability, may still take ten (10) minutes or longer to deliver the required power when called on. This need to cycle the gas turbine fleet is a major issue, and is becoming more problematic with the increased use of intermittent renewable energy sources on the grid.

Currently the gas turbine engines used at power plants can turn down to approximately 50% of their rated capacity. They do this by closing the inlet guide vanes of the compressor, which reduces the air flow to the gas turbine and in turn reduces fuel flow, as a constant fuel air ratio is desired in the combustion process at all engine operating conditions. The goal of maintaining safe compressor operation and gas turbine exhaust emissions typically limit the level of turn down that can be practically achieved.

One way to safely lower the operating limit of the compressor in current gas turbines is by introducing warm air to the inlet of the gas turbine, typically extracted from a mid-stage bleed port on the compressor. Sometimes, this warm air is introduced into the inlet to prevent icing as well. In either case, when this is done, the work that is done to the air by the compressor is sacrificed in the process for the benefit of being able to operate the compressor safely at a lower air flow, yielding the increased turn down capability.

Unfortunately, bleeding air from the compressor has a further negative impact on the efficiency of the overall gas turbine system as the work performed on the air that is bled off is lost. In general, for every 1% of air that is bled off the compressor for this turn down improvement, approximately 2% of the total power output of the gas turbine is lost. Additionally, the combustion system also presents a limit to the system.

The combustion system usually limits the amount that the system can be turned down because as less fuel is added, the flame temperature reduces, increasing the amount of carbon monoxide ("CO") emissions produced. The relationship between flame temperature and CO emissions is exponential with reducing temperature, consequently, as the gas turbine system gets near the turn-down limit, the CO emissions spike up, so it is important to a maintain a healthy margin from this limit. This characteristic limits all gas turbine systems to approximately 50% turn down capability, or, for a 100 MW gas turbine, the minimum power turn-down that can be achieved is about 50%, or 50 MW. As the gas turbine mass flow is turned down, the compressor and turbine efficiency falls off as well, causing an increase in heat rate of the machine. Some operators are faced with this situation every day and as a result, as the load demand falls, gas turbine plants hit its lower operating limit and the gas turbines have to be turned off, which causes the power plant to incur a tremendous maintenance cost penalty.

Another characteristic of a typical gas turbine is that as the ambient temperature increases, the power output goes down proportionately due to the linear effect of the reduced density as the temperature of air increases. Power output can be down by more than 10% from nameplate power rating during hot days, which is typically when peaking gas turbines are called on most frequently to deliver power.

Another characteristic of typical gas turbines is that air that is compressed and heated in the compressor section of the gas turbine is ducted to different portions of the gas turbine's turbine section where it is used to cool various components. This air is typically called turbine cooling and leakage air (hereinafter "TCLA") a term that is well known in the art with respect to gas turbines. Although heated from the compression process, TCLA air is still significantly cooler than the turbine temperatures, and thus is effective in cooling those components in the turbine downstream of the compressor. Typically 10% to 15% of the air that enters the inlet of the compressor bypasses the combustor and is used for this process. Thus, TCLA is a significant penalty to the performance of the gas turbine system.

Other power augmentation systems, like inlet chilling for example, provide cooler inlet conditions, resulting in increased air flow through the gas turbine compressor, and the gas turbine output increases proportionately. For example, if inlet chilling reduces the inlet conditions on a hot day such that the gas turbine compressor has 5% more air flow, the output of the gas turbine will also increase by 5%. As ambient temperatures drops, inlet chilling becomes less effective, since the air is already cold. Therefore, inlet chilling power increase is maximized on hot days, and tapers off to zero at approximately 45° F. ambient temperature days.

In power augmentation systems such as the one discussed in U.S. Pat. No. 6,305,158 to Nakhamkin (the "'158 patent"), there are three basic modes of operation defined, a normal mode, charging mode, and an air injection mode, but it is limited by the need for an electrical generator that has the capacity to deliver power "exceeding the full rated power" that the gas turbine system can deliver. The fact that this patent has been issued for more than ten (10) years and yet there are no known applications of it at a time of rapidly rising energy costs is proof that it does not address the market requirements. First of all, it is very expensive to replace and upgrade the electrical generator so it can deliver power "exceeding the full rated power" that the gas turbine system can currently deliver. Also, although the injection option as disclosed in the '158 patent provides power augmentation, it takes a significant amount of time to start and get on line to the electrical grid. This makes application of the '158 patent impractical in certain markets like spinning reserve, where the power increase must occur in a matter of seconds, and due to do the need for the large auxiliary compressor in these types of systems, that takes too long to start.

Another drawback is that the system cannot be implemented on a combined cycle plant without significant negative impact on fuel consumption and therefore efficiency. Most of the implementations outlined in the '158 patent use a recuperator to heat the air in simple cycle operation, which mitigates the fuel consumption increase issue, however, it adds significant cost and complexity. The proposed invention outlined below addresses both the cost and performance shortfalls of the invention disclosed in the '158 patent.

Also, as outlined in a related U.S. Pat. No. 5,934,063 to Nakhamkin (the "'063 patent"), there is a valve structure that "selectively permits one of the following modes of operation: there is a gas turbine normal operation mode, a mode where air is delivered from the storage system and mixed with air in the gas turbine, and then a charging mode". The '063 patent has also been issued for more than ten (10) years and there are also no known applications of it anywhere in the world. The reason for this is again cost and performance shortfalls, similar to those related to the '158 patent. Although this system can be applied without an efficiency penalty on a simple cycle gas turbine, simple cycle gas turbines do not run very often so they typically do not pay off the capital investment in a timeframe that makes the technology attractive to power plant operators. Likewise, if this system is applied to a combined cycle gas turbine, there is a significant heat rate penalty, and again the technology does not address the market needs. The proposed invention outlined below addresses both the cost and performance issues of the '063 patent.

Gas Turbine (GT) power plants provide a significant amount of power to the grid and are used for both base load capacity and regulation on the grid. Because of fluctuating electrical load demand and fluctuations in renewable energy supply, the GT power plants are required to change load frequently. Typically, the grid operator, who is monitoring the demand, supply and frequency of the grid, sends a signal to the gas turbine fleet on a plant-by-plant basis, to supply more or less power to make the supply meet the demand and hold frequency at 50 or 60 hz. This signal is called an Active Grid Control (AGC) signal.

Electric grids are constantly balancing the power generation dispatched to the grid to match the load demand as close as possible. If the load exceeds the generation, then the grid frequency drops. If the generation exceeds the load, then the frequency increases. The grid operator is constantly trying to match the generation to the load and the faster the response of the generation, the less generation is required to maintain frequency.

Today grid operators maintain about 2% of the total load as spinning reserve to have generation on line that can be used in the event the load increases. A reasonable size grid in the United States, such as the Electric Reliability Council of Texas (ERCOT) can have a load of 60,000 MW, so a 2% spinning reserve is about 1,200 MW. This extra power capacity is referred to as regulation. Many grids use gas turbines to provide this regulation, so there would be 1,200 MW of reserve gas turbine power available. However, this reserve incurs a typical heat rate of 7,000 BTU/kWh, or 8,400 MMBTU/hr of fuel or $33,600/hr ($295 M/year) of fuel cost at $4/MMBTU fuel, not to mention additional emissions to the atmosphere.

The TurboPHASE system (TPM), disclosed in co-pending U.S. patent application Ser. No. 14/350,469, is the only power augmentation system that is specifically designed to add this incremental power to a new or existing gas turbine power plant in seconds, such that the incremental power can provide this spinning reserve. Conventional injection systems like steam injection, typically ramp up over 30 to 60 minutes and off over 30 minutes and are useful for incremental power needs but not spinning reserve for regulation. The TPM system can provide upwards of 10% additional capacity which can completely eliminate the need for, the in-efficiencies of, and the cost of the 2% spinning reserve for grid operators.

The method of how this power augmentation system operates is critical to generating this additional capacity in a reliable manner. Most gas turbine power plants have multiple gas turbines at the power plant and one advantage of the present invention is the compressed air being generated is typically piped to all the gas turbines at the plant for flexibility, therefore, how the air is distributed is also an important feature of the power augmentation system.

As one skilled in the art understands, as the ramp rate of the generating asset is improved, less regulation in total is required. To support this ability to support load fluctuations, some of the grid operators pay a higher rate for the same capacity if it is able to respond faster to changing demand.

SUMMARY

The current invention, which may be referred to herein as TurboPHASET™, provides several options, depending on specific plant needs, to improve the efficiency and power output of a plant at low loads, and to reduce the lower limit of power output capability of a gas turbine while at the same time increasing the upper limit of the power output of the gas turbine, thus increasing the capacity and regulation capability of a new or existing gas turbine system.

One aspect of the present invention relates to methods and systems that allow running gas turbine systems to provide additional power quickly during periods of peak demand.

Another aspect of the present invention relates to an energy storage and retrieval system for obtaining useful work from an existing source of a gas turbine power plant.

Yet another aspect of the present invention relates to methods and systems that allow gas turbine systems to be more efficiently turned down during periods of lowered demand.

One embodiment of the invention relates to a system comprising at least one existing gas turbine that comprises one first compressor, at least one electrical generator, at least one turbine connected to the generator and the compressor, a combustor, and a combustion case (which is the discharge manifold for the compressor) and further comprising a supplemental compressor which is not the same as the first compressor.

An advantage of other preferred embodiments of the present invention is the ability to increase the turn down capability of the gas turbine system during periods of lower demand and improve the efficiency and output of the gas turbine system during periods of high demand.

Another advantage of embodiments of the present invention is the ability to increase the turn down capability of the gas turbine system during periods of low demand by using a supplemental compressor driven by a fueled engine, operation of which is which is independent of the electric grid.

Another advantage of embodiments of the present invention is the ability to increase the turn down capability of the gas turbine system during periods of low demand by using a supplemental compressor driven by a fueled engine which produces heat that can be added to compressed air flowing to the combustion case, from either the supplemental compressor, an air storage system, or both, or such heat can be added to the steam cycle in a combined cycle power plant.

Another advantage of some embodiments of the present invention is the ability to increase output of the gas turbine system during periods of high demand by using a supplemental compressor which is not driven by power produced by the gas turbine system.

Another advantage of some embodiments of the present invention is the ability to increase output of the gas turbine system during periods of high demand by using a supplemental compressor which is driven by steam produced by the heat recovery steam generator of a combined cycle power plant.

Another advantage of the present invention is the ability to incorporate selective portions of the embodiments on existing gas turbines to achieve specific plant objectives.

Another advantage of an embodiment of the present invention is the ability to inject compressed air into a turbine cooling circuit without heating up the air prior to such injection, and because cool cooling air can achieve the same desired metal temperatures with use of less compressed air (as compared to heated compressed air), efficiency is improved.

Another advantage of another embodiment of the present invention is that because the incremental amount of compressed air can be added at a relatively constant rate over a wide range of ambient temperatures, the power increase achieved by the gas turbine is also relatively constant over a wide range of ambient temperatures. Additionally, since the supplemental compressed air is delivered without any significant power increase from the gas turbine's compressor, (because the compressed air is from either a separately fueled compressor or an a compressed air storage system), for every 1% of air injected (by mass flow), a 2% power increase results. This is significant because other technologies, such as inlet chillers, for supplementing power yield closer to a 1% power increase for each 1% increase of injected air, therefore, twice as much power boost is achieved with the same incremental air flow through the turbine and combustor, resulting in a physically smaller, and lower cost, power supplementing system.

One preferred embodiment of the present invention includes an intercooled compression circuit using a supplemental compressor to produce compressed air that is stored in one or more high pressure air storage tanks, wherein the intercooling process heat absorbed from the compressed air during compression is transferred to the steam cycle of a combined cycle power plant.

Optionally, when integrated with a combined cycle gas turbine plant with a steam cycle, steam from the steam cycle can be used to drive a secondary steam turbine which in turn drives a supplemental compressor. The use of high pressure air storage tanks in conjunction with firing this air directly in the gas turbine gives the gas turbine the ability to deliver much more power than could be otherwise produced, because the maximum mass flow of air that is currently delivered by the gas turbine system's compressor to the turbine is supplemented with the air from the air tanks. On existing gas turbines, this can increase the output of a gas turbine system up to the current generator limit on a hot day, which could be as much as an additional 20% power output, while at the same time increasing the turn down capability by 25-30% more than current state of the art.

On new gas turbines, the generator and turbine can be oversized to deliver this additional power at any time, thus increasing the name plate power rating of the system by 20% at a total system cost increase that is much lower than 20%, with 25-30% more turn down capability than the current state of the art.

Other advantages, features and characteristics of the present invention, as well as the methods of operation and the functions of the related elements of the structure and the combination of parts will become more apparent upon consideration of the following detailed description and appended claims with reference to the accompanying drawings, all of which form a part of this specification.

The current invention describes several modes of how the TurboPHASE system (TPM) is controlled including pre-heating the system, starting air injection, stopping air injection and shutting down the system.

One aspect of the present invention relates to methods and systems that control the heat up of the TPM. By preheating the air injection piping of the TPM, thermal shock (rapid injection of hot air through cold pipes) is prevented.

Another aspect of the present invention relates to a method for controlling the start-up of the TPM as well as to prepare the TPM to inject compressed air into the gas turbine (GT) engine. This process is important and unique as there is often more than one TPM at the gas turbine power plant supplying compressed air to a common manifold feeding the GT engine.

Another aspect of the present invention relates to methods and systems which control the shutdown of the TPM. This process is also important and unique because there is typically more than one TPM at the gas turbine power plant supplying compressed air to a common manifold feeding the GT engine.

One embodiment of the invention relates to a system comprising multiple TPMs injecting compressed air into multiple GTs with a valve system and control methodology that allows hot air to flow from the GTs to the TPMs when the TPMs are not operating and/or from the TPMs to the GTs when one or more TPMs are operating. This valve structure and method of controlling the valve structure allows for an efficient pre-heating of the piping portion of the air injection system.

Another advantage of the present invention provides a method for operating multiple TPMs which inject compressed air into multiple GTs with a valve system and control methodology that allows individual TPMs to be started and accelerated to a condition where they are ready to inject compressed hot air into the GT engine.

Another advantage of the present invention is a system and method of operating where multiple TPMs inject compressed air into multiple GTs with a valve system and control methodology that allows hot air to be smoothly ramped from a "no flow" condition to a "full flow" condition.

Another advantage of the present invention is a control methodology for a system comprising multiple TPM's injecting compressed air into multiple GTs having a valve system where the methodology allows one or more of the TPMs to be shut down while the remainder of the TPMs are still operating and injecting air.

Another advantage of the present invention is a methodology for a system comprising multiple TPM's injecting compressed air into multiple GTs having a valve system where the methodology allows all TPMs to be shut down after the air injection from the TPMs is complete.

Additional advantages and features of the present invention will be set forth in part in a description which follows, and in part will become apparent to those skilled in the art upon examination of the following, or may be learned from practice of the invention. The instant invention will now be described with particular reference to the accompanying drawings.

BRIEF DESCRIPTION OF THE SEVERAL VIEWS OF THE DRAWINGS

The present invention is described in detail below with reference to the attached drawing figures, wherein.

DETAILED DESCRIPTION

Figure 1:
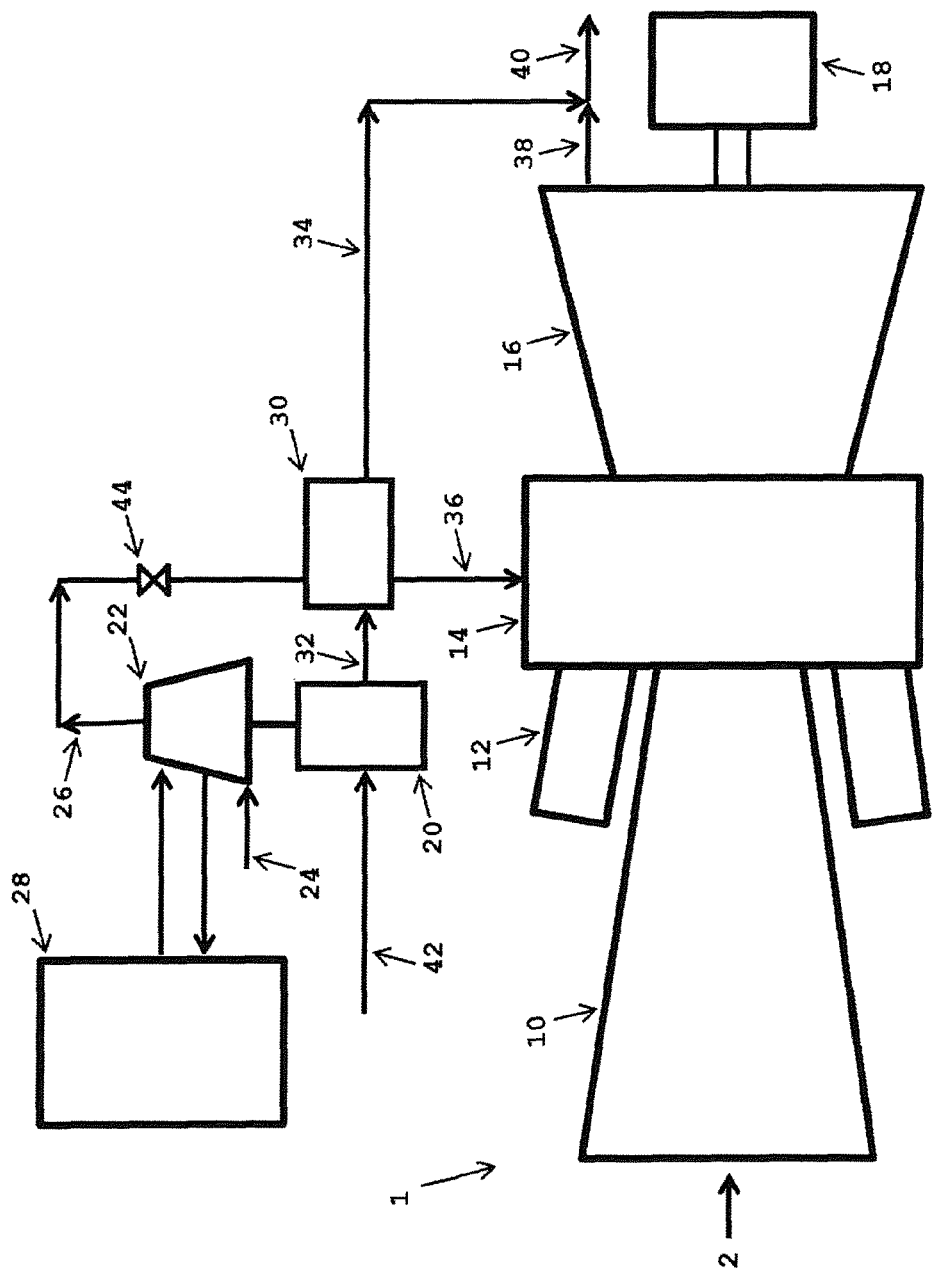
FIG. 1 is a schematic drawing of an embodiment of the present invention having a supplemental energy system with a recuperated engine driving the supplemental compressor.

The components of one embodiment of the present invention are shown in FIG. 1 as they are used with an existing gas turbine system 1. The existing gas turbine system 1, which compresses ambient air 2, includes a compressor 10, combustor 12, combustion case 14, turbine 16 and generator 18. A fueled engine 20 is used to drive a multistage intercooled supplemental compressor 22 which compresses ambient air 24 and discharges compressed air 26. As used herein, the term "fueled engine" means a reciprocating internal combustion engine, a gas turbine (in addition to the gas turbine in the existing gas turbine system 1, or a similar machine that converts fuel into energy through an exothermic reaction such as combustion (e.g., gasoline, diesel, natural gas, or biofuel and similar fuel). The fueled engine draws in ambient air 42 and as a result of the combustion process, produces hot exhaust gas 32. As those skilled in the art will readily appreciate, as air in the supplemental compressor 22 passes from one compressor stage to the next, the air is intercooled by use of an intercooler heat exchanger 28, such as a cooling tower, to reduce the work required to compress the air at the subsequent compressor stage. As used herein, the term "intercooler heat exchanger" means a heat exchanger that receives compressed air from an upstream stage of a compressor, and cools that air before delivering it to another compression stage downstream of the upstream compressor stage. Use of the intercooler heat exchanger 28 increases the efficiency of the supplemental compressor 22, which makes it more efficient than the compressor 10 of the existing gas turbine system 1. As those skilled in the art will readily appreciate, although referred to herein as an "intercooler", the intercooler heat exchanger 28 actually includes an intercooler and an after-cooler as described in greater detail below.

This embodiment further includes a recuperator 30, which is a heat exchanger that receives the exhaust gas 32 from the fueled engine 20 and the compressed air 26 from the supplemental compressor 22. Flow of compressed air from the supplemental compressor 22 to the recuperator 30 is controlled by the recuperator flow control valve 44. Within the recuperator 30, the hot exhaust gas 32 heats the compressed air 26 and then exits the recuperator 30 as substantially cooler exhaust gas 34. At the same time in the recuperator 30, the compressed air 26 absorbs heat from the exhaust gas 32 and then exits the recuperator 30 as substantially hotter compressed air 36 than when it entered the recuperator 30. The substantially hotter compressed air 36 is then discharged from the recuperator 30 into the combustion case 14 of the gas turbine system 1 where it becomes an addition to the mass flow through the turbine 16.

The cooler exhaust gas 34 is then discharged to atmosphere. A selective catalytic reduction ("SCR") device (not shown) of the type known in the art, can be inserted before, in the middle of, or after the recuperator 30 to achieve the most desirable condition for the SCR function. Alternately, after the SCR device, the cooler exhaust gas 34 can be injected into the exhaust gas 38 of the turbine 16 as shown in FIG. 1, and then the mixed flow exhaust 38 will either be discharged to the atmosphere (in the case for the simple cycle gas turbine) or directed to the heat recovery steam generator ("HRSG") of a steam turbine of the type known in the art (not shown) in combined cycle power plants. If the mixed flow exhaust 38 is to be discharged into the HRSG, the means used must ensure that the exhaust gas 38 flow from the turbine 16 into the HRSG and the SCR device is not disrupted. On "F-Class" engines, such as the General Electric Frame 9FA industrial gas turbine, there are large compressor bleed lines that, for starting purposes, bypass air around the turbine section and dump air into the exhaust plenum of the turbine 16. These bleed lines are not in use when the gas turbine system 1 is loaded, and therefore are a good place to discharge the cooler exhaust gas 34 after it exits the recuperator 30, since these compressor bleed lines are already designed to minimize the impact on the HRSG and SCR device. By injecting the exhaust 32 from the fueled engine 20 into to exhaust 38 of the gas turbine system 1, the SCR of the gas turbine system 1 may be used to clean the exhaust 32, thus eliminating an expensive system on the fueled engine 20.

It turns out that gasoline, diesel, natural gas, or biofuel and similar reciprocating engines are not sensitive to back pressure, so putting the recuperator 30, on the fueled engine 20 does not cause a measurable effect on the performance of the fueled engine 20. This is significant because other heat recovery systems, such as the HRSGs used in the exhaust of a typical gas turbine power plants, create a significant power loss all of the time, independent of whether a power augmentation system is in use or not.

The power from the fueled engine 20 is used to drive the intercooled compressor 22. If the installation does include a HS G and a steam turbine, the auxiliary heat from the engine jacket, oil cooler and turbocharger on the fueled engine 20 can be transferred into the steam cycle of the steam turbine via the HSRG (typically the low pressure and temperature condensate line). Likewise, heat removed by the intercooler heat exchanger 28 from the air as it is compressed in the multistage supplemental compressor 22 can be transferred into the steam cycle in a similar manner, prior to the compressed air being cooled by the cooling tower, to lower the temperature of the compressed air to the desired temperature prior to entering the subsequent compression stage of the supplemental compressor 22. If an auxiliary gas turbine is used as the fueled engine 20 instead of a reciprocating engine, lower emission rates will be achievable, which will allow emission permitting even in the strictest environmental areas. Also, if the auxiliary gas turbine is used as the fueled engine 20, the exhaust gas from the auxiliary gas turbine can be piped directly to the exhaust bleed pipes of the existing gas turbine system 1 described above, thus avoiding the cost and maintenance of an additional SCR device.

When peaking with this system, the gas turbine system 1 will most likely be down in power output and flow (assuming that the peaking is needed in the summer when higher ambient air temperatures reduce total mass flow through the gas turbine system 1 which in turn reduces power output of the gas turbine system 1 as a whole, and the supplemental compressor 22 will just bring the air mass flow through the gas turbine system 1 back up to where the flow would have been on a cooler day (i.e. a day on which the full rated power of the gas turbine system 1 could be achieved).

Figure 2:
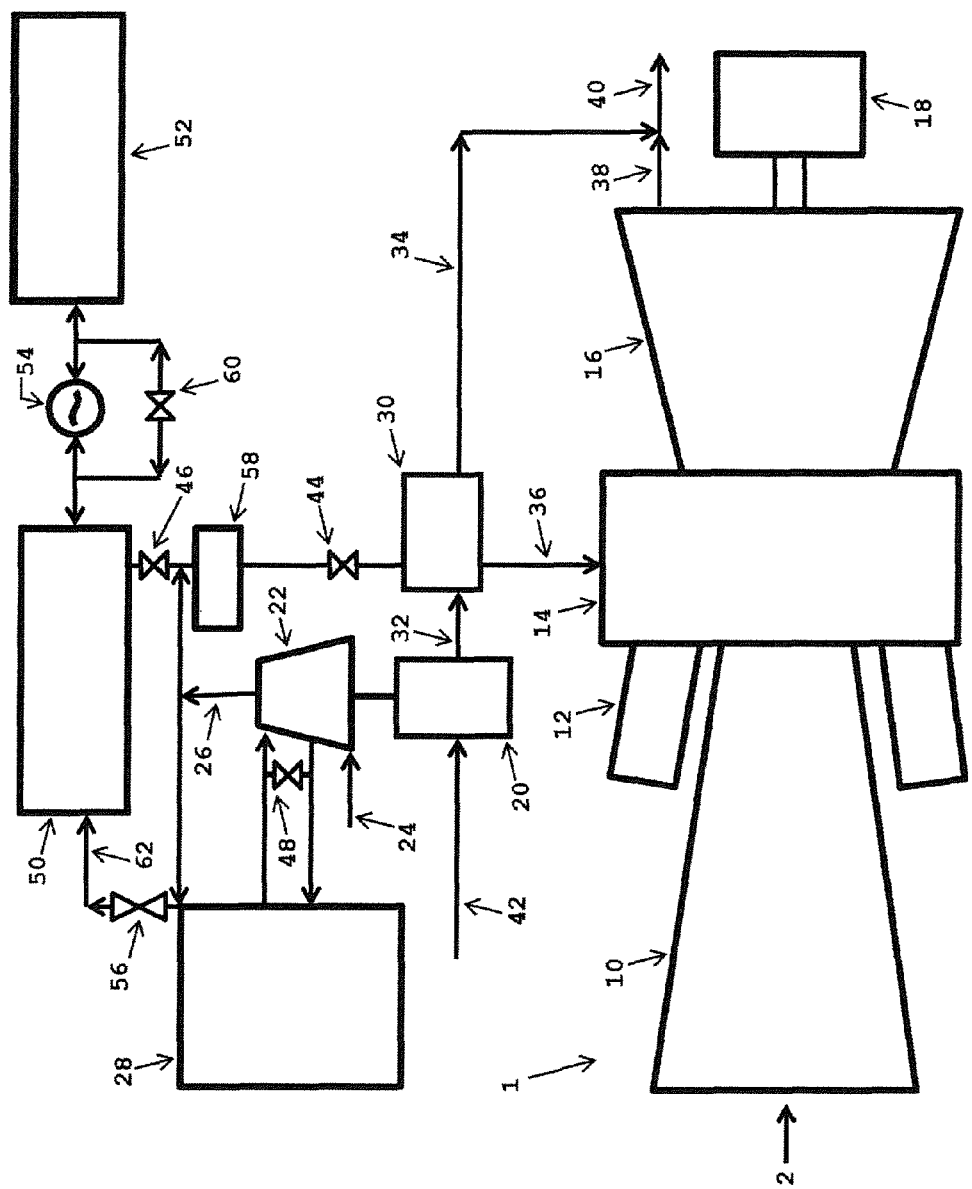
FIG. 2 is a schematic drawing of an embodiment of the present invention having a supplemental energy system with a recuperated engine driving the supplemental compressor and energy storage.

FIG. 2 shows the embodiment of FIG. 1 with the addition of compressed air storage. The compressed air storage system includes an air storage tank 50, a hydraulic fluid tank 52, and a pump 54 for transferring hydraulic fluid, such as water, between the hydraulic fluid tank 52 and the air storage tank 50. According to preferred embodiments, during periods when increased power delivery is needed, the air exit valve 46 opens, the air bypass valve 48 opens, the air inlet valve 56 closes, and the supplemental compressor 22 is operated, driven by the fueled engine 20. As one skilled in the art will readily appreciate, if compressed air is to be stored for later use, it will likely need to be stored at a higher pressure, thus, the supplemental compressor 22 would preferably have additional stages of compression, as compared to the supplemental compressor 22 of the embodiment shown in FIG. 1. These additional stages may be driven by the fueled engine 20 all the time, or may be capable of being driven intermittently by installing a clutch type mechanism that only engages the additional stages when the fueled engine 20 is operated to store compressed air in the air storage tank 50 (where the desired storage pressure is substantially higher to minimize the required volume of the air storage tank 50). Alternatively, the additional stages may be decoupled from the fueled engine 20 and driven by a separately fueled engine (not shown) or other means, such as an electric motor.

The compressed air 26 flowing from the supplemental compressor 22 is forced to flow to the mixer 58 as opposed to towards the intercooler heat exchanger 28 because the air inlet valve 56, which controls air flow exiting the intercooler heat exchanger 28, is closed. The compressed air 26 flowing from the outlet of the supplemental compressor 22 is mixed in the mixer 58 with the compressed air exiting the air storage tank 50 and introduced to the recuperator 30 where it absorbs heat from the exhaust gas of the fueled engine 20 before being introduced into the combustion case 14 using the process described below. As those skilled in the art will readily appreciate, for thermal efficiency purposes, the recuperator 30 would ideally be a counter-flow heat exchanger, since that would allow the maximum amount of heat from the exhaust 32 to be transferred to the compressed air exiting the air storage tank 50. Alternately, if the recuperator 30 is made up of one or more cross-flow heat exchangers, it can have a first stage, which is a first cross-flow heat exchanger, followed by a second stage, which is a second cross-flow heat exchanger. In this configuration, where the exhaust 32 first enters the first stage of the recuperator, is partially cooled, then flows to the second stage of the recuperator. At the same time, the compressed air exiting the air storage tank 50 first enters the second stage of the recuperator 30, where additional heat is extracted from the partially cooled exhaust 32, thereby "pre-heating" the compressed air. The compressed air then flows to the first stage of the recuperator 30 where it is heated by exhaust 32 that has not yet been partially cooled, prior to flowing to the mixer 58 to join the air flowing from the supplemental compressor 22. In this case, the "two stage" recuperator acts more like a counter-flow heat exchanger, yielding higher thermal efficiency in the heating of the compressed air.

As those skilled in the art will readily appreciate, since the air being compressed in the supplemental compressor 22 is bypassing the intercooler heat exchanger 28 due to the bypass valve 48 being open, the compressed air exiting the supplemental compressor 22 retains some of the heat of compression, and when mixed with the compressed air flowing from the air storage tank 50, will increase the temperature of the mixed air so that when the mixed air enters the recuperator 30, it is hotter than it would be if only compressed air from the air storage tank 50 was being fed into the recuperator 30. Likewise, if the air exiting the air storage tank 50 is first preheated in a "second stage" of the recuperator as described above prior to entering the mixer 58, an even hotter mixture of compressed air will result, which may be desirable under some conditions.

As the combustion turbine system 1 continues to be operated in this manner, the pressure of the compressed air in the air storage tank 50 decreases. If the pressure of the compressed air in the air storage tank 50 reaches the pressure of the air in the combustion case 14, compressed air will stop flowing from the air storage tank 50 into the gas turbine system 1. To prevent this from happening, as the pressure of the compressed air in the air storage tank 50 approaches the pressure of the air in the combustion case 14, the fluid control valve 60 remains closed, and the hydraulic pump 54 begins pumping a fluid, such as water, from the hydraulic fluid tank 52 into the air storage tank 50 at a pressure high enough to drive the compressed air therein out of the air storage tank 50, thus allowing essentially all of the compressed air in the air storage tank to be delivered to the combustion case 14.

As those skilled in the art will readily appreciate, if additional compressor stages, or high pressure compressor stages, are added separate from the supplemental compressor 22 driven by the fueled engine 20, then, if desired, air from the gas turbine combustion case 14 can be bled and allowed to flow in reverse of the substantially hotter compressed air 36 as bleed air from the gas turbine combustion case 14 and take the place of air from the separately fueled engine 20 driven supplemental compressor 22. In this case, the bleed air could be cooled in the intercooler heat exchanger 28, or a cooling tower, and then delivered to the inlet of the high pressure stages of the supplemental compressor 22. This may be especially desirable if low turn down capability is desired, as the bleed air results in additional gas turbine power loss, and the drive system for the high pressure stages of the supplemental compressor 22 can driven by an electric motor, consuming electrical power generated by the gas turbine system 1, which also results in additional gas turbine power loss. As those skilled in the art will readily appreciate, this is not an operating mode that would be desirable during periods when supplemental power production from the gas turbine system is desired.

According to preferred embodiments, independent of whether or not the hydraulic system is used, when the air stops flowing from the air storage tank 50, the supplemental compressor 22 can continue to run and deliver power augmentation to the gas turbine system 1. According to other preferred embodiments, such as the one shown in FIG. 1, the supplemental compressor 22 is started and run without use of an air storage tank 50. Preferably, an intercooler heat exchanger 28 is used to cool air from a low pressure stage to a high pressure stage in the supplemental compressor 22 that compresses ambient air 24 through a multistage compressor 22.

The air inlet valve 56, the air outlet valve 46, the bypass valve 48, and the supplemental flow control valve 44, are operated to obtain the desired operating conditions of the gas turbine system 1. For example, if it is desired to charge the air storage tank 50 with compressed air, the air outlet valve 46, the bypass valve 48 and the supplemental flow control valve 44 are closed, the air inlet valve 56 is opened and the fueled engine 20 is used to drive the supplemental compressor 22. As air is compressed in the supplemental compressor 22, it is cooled by the intercooler heat exchanger 28 because the bypass valve 48 is closed, forcing the compressed air to flow through the intercooler heat exchanger 28. Air exiting the supplemental compressor 22 then flows through the air inlet valve 56 and into the air storage tank 50. Likewise, if it is desired to discharge compressed air from the air storage tank 50 and into the combustion case 14 the air outlet valve 46, the bypass valve 48 and the supplemental flow control valve 44 are opened, and the air inlet valve 56 can be closed, and the fueled engine 20 can be used to drive the supplemental compressor 22.

As air is compressed in the supplemental compressor 22, it heats up due to the heat of compression, and it is not cooled in the intercooler heat exchanger because bypass valve 48 is open, thereby bypassing the intercooler heat exchanger. Compressed air from the air storage tank 50 then flows through the mixer 58 where it is mixed with hot air from the supplemental compressor 22 and then flows to the recuperator 30 where it absorbs heat transferred to the recuperator 30 from the exhaust gas 32 of the fueled engine 20 and then flows on to the combustion case 14. In the event that all of the airflow from the supplemental compressor 22 is not needed by the gas turbine system 1, this embodiment can be operated in a hybrid mode where the some of the air flowing from the supplemental compressor 22 flows to the mixer 58 and some of the air flow from the supplemental compressor 22 flows through the intercooler heat exchanger 28 and then through the air inlet valve 56 and into the air storage tank 50.

As those skilled in the art will readily appreciate, the preheated air mixture could be introduced into the combustion turbine at other locations, depending on the desired goal. For example, the preheated air mixture could be introduced into the turbine 16 to cool components therein, thereby reducing or eliminating the need to extract bleed air from the compressor to cool these components. Of course, if this were the intended use of the preheated air mixture, the mixture's desired temperature would be lower, and the mixture ratio in the mixer 58 would need to be changed accordingly, with consideration as to how much heat, if any, is to be added to the preheated air mixture by the recuperator 30 prior to introducing the compressed air mixture into the cooling circuit(s) of the turbine 16. Note that for this intended use, the preheated air mixture could be introduced into the turbine 16 at the same temperature at which the cooling air from the compressor 10 is typically introduced into the TCLA system of the turbine 16, or at a cooler temperature to enhance overall combustion turbine efficiency (since less TCLA cooling air would be required to cool the turbine components).

It is to be understood that when the air storage tank 50 has hydraulic fluid in it prior to the beginning of a charging cycle to add compressed air to the air storage tank 50, the fluid control valve 60 is opened so that as compressed air flows into the air storage tank 50 it drives the hydraulic fluid therein out of the air storage tank 50, through the fluid control valve 60, and back into the hydraulic fluid tank 52. By controlling the pressure and temperature of the air entering the turbine system 1, the gas turbine system's turbine 16 can be operated at increased power because the mass flow of the gas turbine system 1 is effectively increased, which among other things, allows for increased fuel flow into the gas turbine's combustor 12. This increase in fuel flow is similar to the increase in fuel flow associated with cold day operation of the gas turbine system 1 where an increased mass flow through the entire gas turbine system 1 occurs because the ambient air density is greater than it is on a warmer (normal) day.

During periods of higher energy demand, the air flowing from the air storage tank 50 and supplemental compressor 22 may be introduced to the gas turbine system 1 in a manner that offsets the need to bleed cooling air from the compressor 10, thereby allowing more of the air compressed in the compressor 10 to flow through the combustor 12 and on to the turbine 16, thereby increasing the net available power of the gas turbine system 1. The output of the gas turbine 16 is very proportional to the mass flow rate through the gas turbine system 1, and the system described above, as compared to the prior art patents, delivers higher flow rate augmentation to the gas turbine 16 with the same air storage volume and the same supplemental compressor size, when the two are used simultaneously to provide compressed air, resulting in a hybrid system that costs much less than the price of prior art systems, while providing comparable levels of power augmentation.

The supplemental compressor 22 increases the pressure of the ambient air 24 through at least one stage of compression, which is then cooled in the intercooler heat exchanger 28, further compressed in a subsequent stage of the supplemental compressor 22, and then after-cooled in the intercooler heat exchanger 28 (where the compressed air exiting the last stage of the supplemental compressor 22 is then after-cooled in the same intercooler heat exchanger 28), and then the cooled, compressed, high pressure air is delivered to the air storage tank 50 via the open air inlet valve 56 and the inlet manifold 62, and is stored in the air storage tank 50.

As the pressurized air flowing through the intercooler heat exchanger 28 is cooled, the heat transferred therefrom can be used to heat water in the H SG to improve the efficiency of the steam turbine. An alternate method to cool the compressed air in the intercooler heat exchanger 28 is to use relatively cool water from the steam cycle (not shown) on a combined cycle plant. In this configuration, the water would flow into the intercooler heat exchanger 28 and pick up the heat that is extracted from the compressed air from the supplemental compressor 22, and the then warmer water would exit the intercooler heat exchanger 28 and flow back to the steam cycle. With this configuration, heat is captured during both the storage cycle described in this paragraph, and the power augmentation cycle described below.

According to preferred embodiments, the air storage tank 50 is above-ground, preferably on a barge, skid, trailer or other mobile platform and is adapted or configured to be easily installed and transported. The additional components, excluding the gas turbine system 1, should add less than 20,000 square feet, preferably less than 15,000 square feet, and most preferably less than 10,000 square feet to the overall footprint of the power plant. A continuous augmentation system of the present invention takes up 1% of the footprint of a combined cycle plant and delivers from three to five times the power per square foot as compared to the rest of the plant, thus it is very space efficient, while a continuous augmentation system of the present invention with storage system takes up 5% of the footprint of the combined cycle plant and delivers from one to two times the power per square foot of the power plant.

Figure 3:
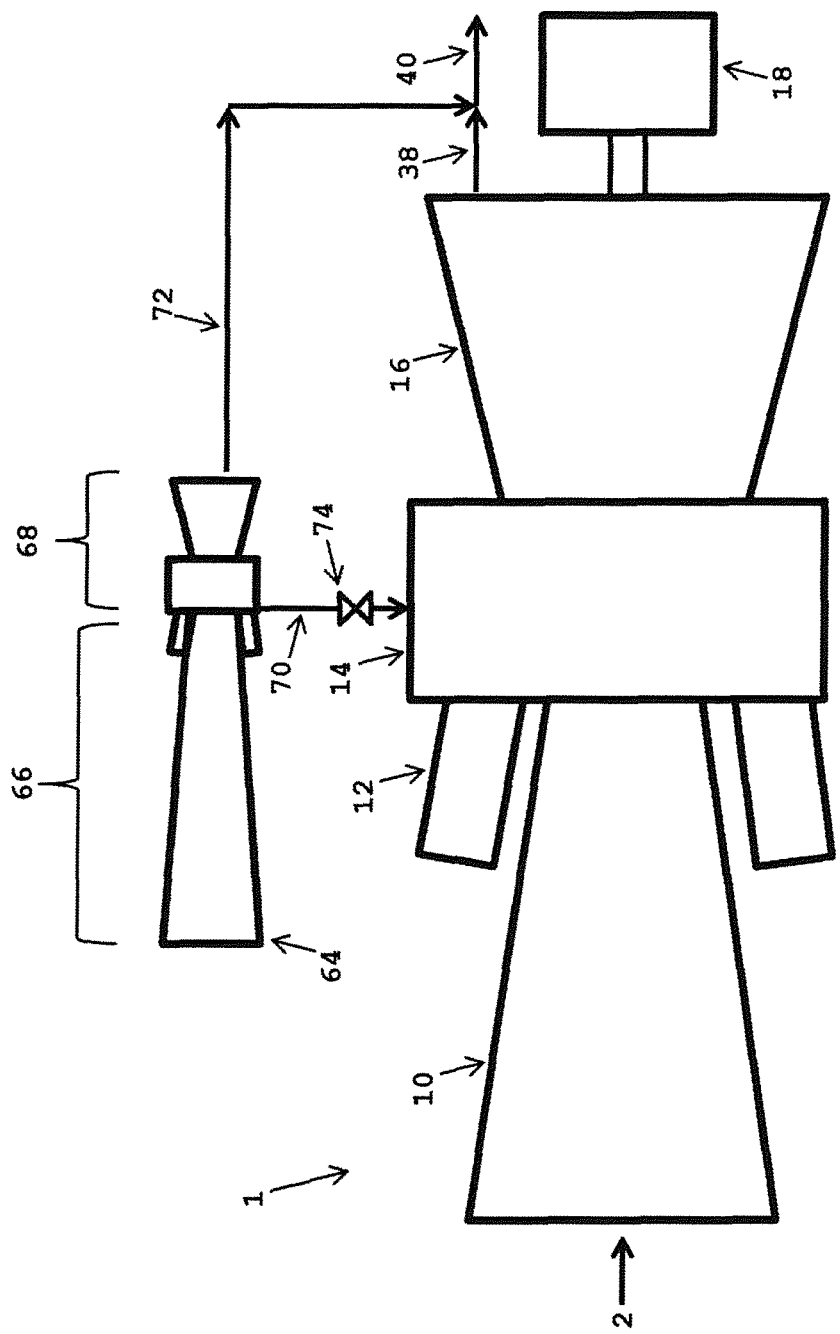
FIG. 3 is a schematic drawing of an embodiment of the present invention incorporating a continuous power augmentation system.

FIG. 3 shows another embodiment of the present invention in which an auxiliary gas turbine 64 is used to provide supplemental air flow at times when additional power output from the gas turbine system 1 is needed. The auxiliary gas turbine 64 includes a supplemental compressor section 66 and a supplemental turbine section 68. In this embodiment, the auxiliary gas turbine is designed so that substantially all of the power produced by the supplemental turbine section 68 is used to drive the supplemental compressor section 66. As used herein the term "substantially all" means that more than 90% of the power produced by the supplemental turbine section 68 is used to drive the supplemental compressor 66, because major accessories, such as the electric generator used with the gas turbine system 1, are not drawing power from the auxiliary gas turbine section 68. Manufacturers of small gas turbines, such as Solar Turbines Inc., have the capability to mix and match compressors and combustors/turbines because they build their systems with multiple bearings to support the supplemental compressor section 66 and the supplemental turbine section 68. A specialized turbine, with an oversized gas turbine compressor 66 and with a regular sized turbine/combustion system 68 is used to provide additional supplemental airflow to the gas turbine system 1, and the excess compressed air 70 output from the oversized compressor 66, which is in excess of what is needed to run the turbine/combustion system 68, flows through the combustion case flow control valve 74, when it is in the open position, and is discharged into the combustion case 14 of the gas turbine system 1 to increase the total mass flow through the turbine 16 of the gas turbine system 1, and therefore increases the total power output by the gas turbine system 1. For example, a 50 lb/sec combustor/turbine section 68 that would normally be rated for 4 MW, may actually be generating 8 MW, but the compressor is drawing 4 MW, so the net output from the generator is 4 MW. If such a turbine were coupled with a 100 lb/sec compressor on it, but only 50 lbs/sec were fed to the combustor/turbine section 68, the other 50 lb/sec could be fed to the combustion case of the gas turbine system 1. The exhaust 72 of the 50 lb/sec combustor/turbine section 68 could be injected into the exhaust 38 of the main turbine 16 similar to the manner described in the embodiment shown in FIG. 1, and jointly sent to the SCR. Optionally, the exhaust can be separately treated, if required.

Obviously, the pressure from the 100 lb/sec compressor 66 has to be sufficient to drive the compressed air output therefrom into the combustion case 14. Fortunately, many of the smaller gas turbine engines are based on derivatives of aircraft engines and have much higher pressure ratios than the large industrial gas turbines used at most power plants. As shown in FIG. 3, this embodiment of the present invention does not include the recuperator 30, the intercooled compressor 22, or the intercooler heat exchanger 28 shown in FIGS. 1 and 2. Of course, the embodiment shown in FIG. 3 does not provide the efficiency improvement of the intercooled embodiments shown in FIGS. 1 and 2, however the initial cost of the embodiment shown in FIG. 3 is substantially less, which may make it an attractive option to operators of power plants that typically provide power in times of peak demand, and that therefore are not run much and are less sensitive to fuel efficiency. When the auxiliary gas turbine 64 is not running, the combustion case flow control valve 74 is closed.

Figure 4:
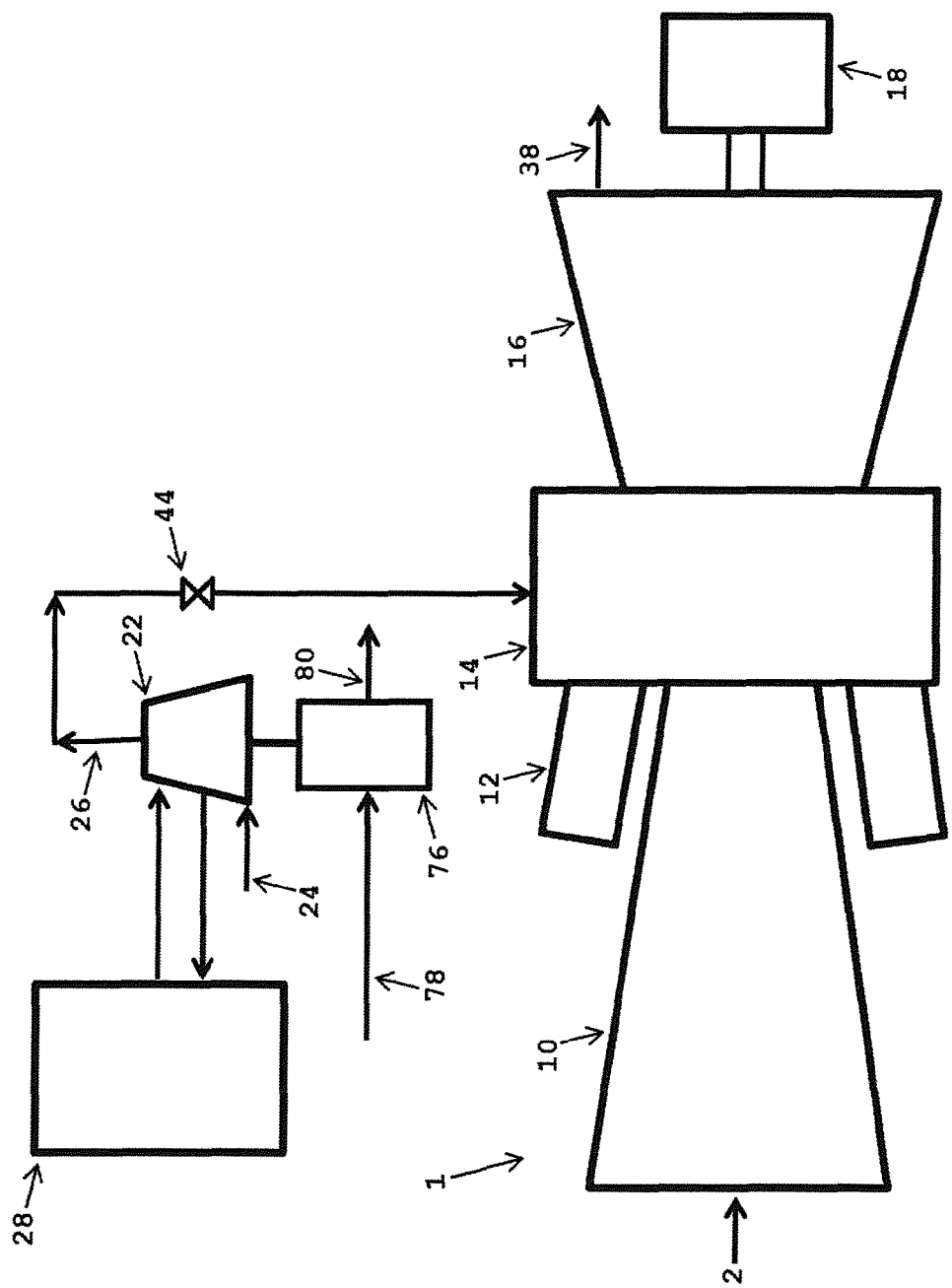
FIG. 4 is a schematic drawing of an embodiment of the present invention in which an auxiliary steam turbine is drives the supplemental compressor.

The embodiment shown in FIG. 4 shows another way to incorporate a supplemental compressor 22 into the gas turbine system 1. In some situations, the gas turbine augmentation of the present invention with (i) the additional mass flow to the HRSG, and/or (ii) the additional heat from the intercooler heat exchanger 28 and fueled engine 20 (as compared to a gas turbine system 1 that does not incorporate the present invention), may be too much for the steam turbine and/or the steam turbine generator to handle if all of the additional heat flows to the steam turbine generator (especially if the power plant has duct burners to replace the missing exhaust energy on hot days). In this case, the additional steam generated as a result of adding the heat of compression generated by the supplemental compressor 22 can be extracted from the steam cycle HRSG. As it happens, when compressed air augmentation is added to the gas turbine system 1, the heat energy extracted from the intercooler heat exchanger 28 generates about the same amount of energy that it takes to drive the supplemental compressor 22. In other words, if you had a steam turbine that generated 100 MW normally and 108 MW when the supplemental compressor 22 was injecting compressed air into the gas turbine system 1, the extra 8 MW is approximately equal to the power requirement to drive the intercooled supplemental compressor 22. Therefore, if some of the steam is extracted from the steam cycle of the power plant, and the steam turbine is kept at 100 MW, a small auxiliary steam turbine 76 can be used to drive the intercooled supplemental compressor 22, and there would be no additional source of emissions at the power plant.

In FIG. 4, an auxiliary steam turbine 76 drives the intercooled supplemental compressor 22 and the steam 78 that is used to drive the steam engine 76, which comes from the HRSG (not shown) of the power plant, is the extra steam produced from the heat, being added to the HRSG, which was extracted by the intercooler heat exchanger 22 during compression of air in the supplemental compressor 22. The exhaust 80 of the steam engine 76 is returned to the HRSG where it is used to produce more steam. This embodiment of the present invention results in a significant efficiency improvement because the compression process of the supplemental compressor 22 is much more efficient than the compressor 10 of the gas turbine system 1. In this situation, the power augmentation level will, of course, be reduced as the steam turbine will not be putting out additional MW, however there will be no other source of emissions/fuel burn.

Figure 5:
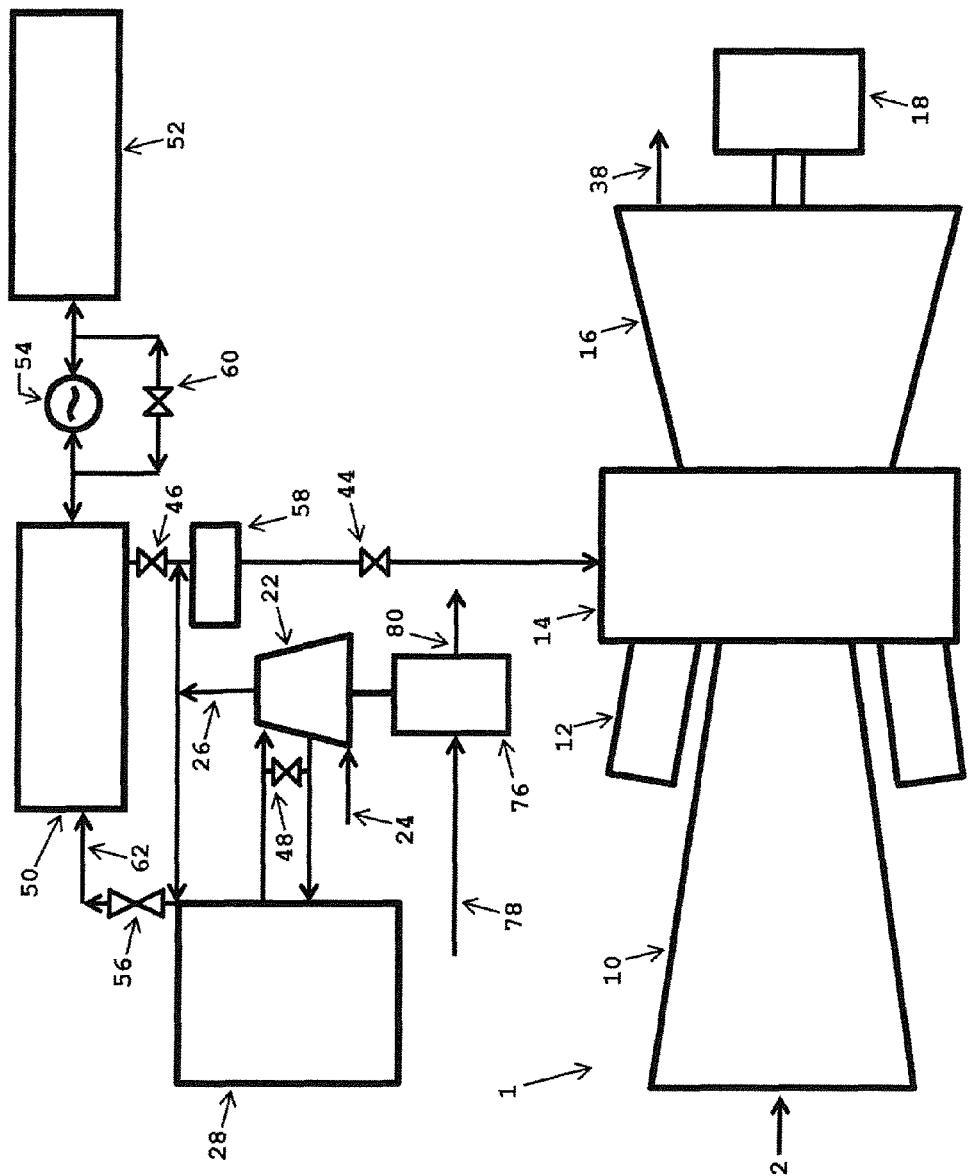
FIG. 5 is a schematic drawing of an embodiment of the present invention in which includes an auxiliary steam turbine driving the supplemental compressor and energy storage.

FIG. 5 shows the embodiment of FIG. 4 with the addition of compressed air storage. This implementation of compressed air energy storage is similar to that described with respect to FIG. 2, as is the operation thereof. As those skilled in the art will readily appreciate, the power augmentation level of the embodiment shown in FIG. 5 is less than the embodiment shown in FIG. 2, since the steam turbine will not be putting out additional MW, however there will be no other source of emissions/fuel burn.

Figure 6:
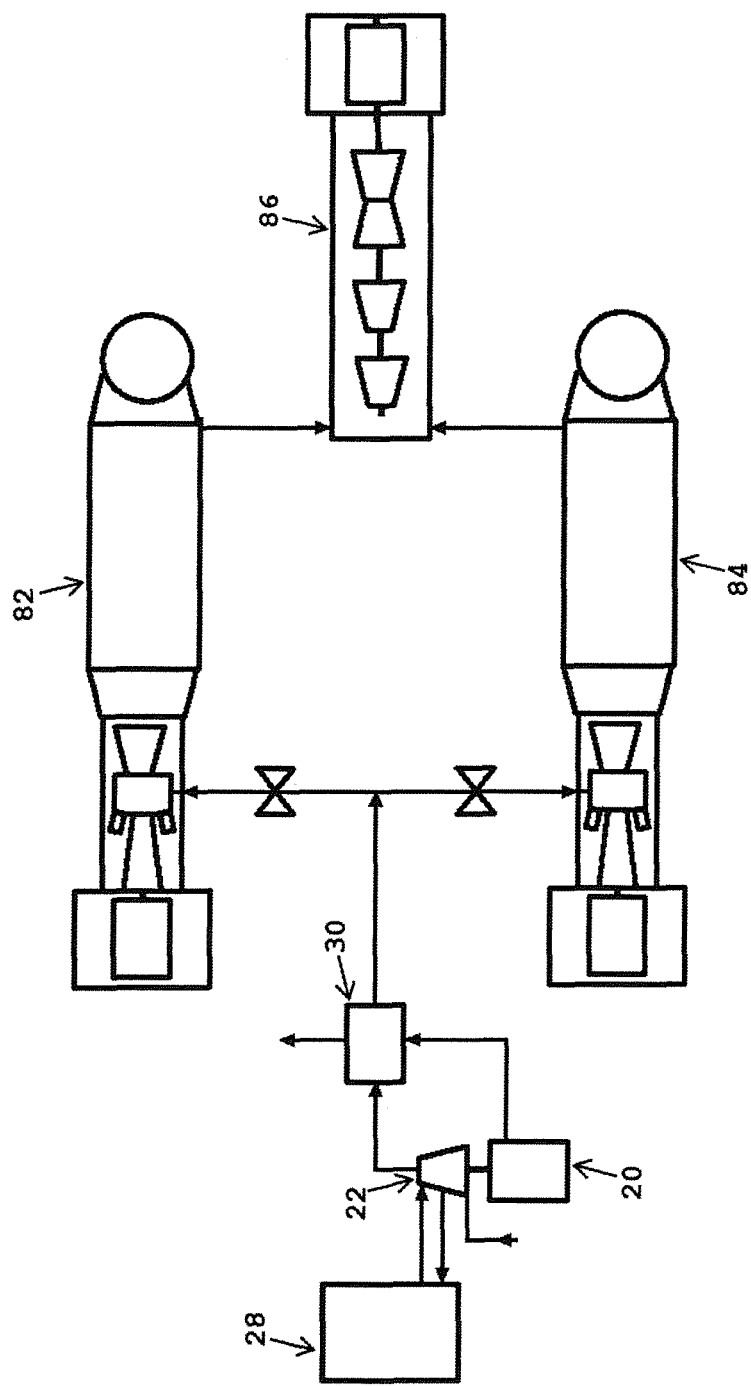
FIG. 6 is a schematic drawing of an embodiment of the present invention installed in conjunction with two gas turbines and a steam turbine.
Figure 7:
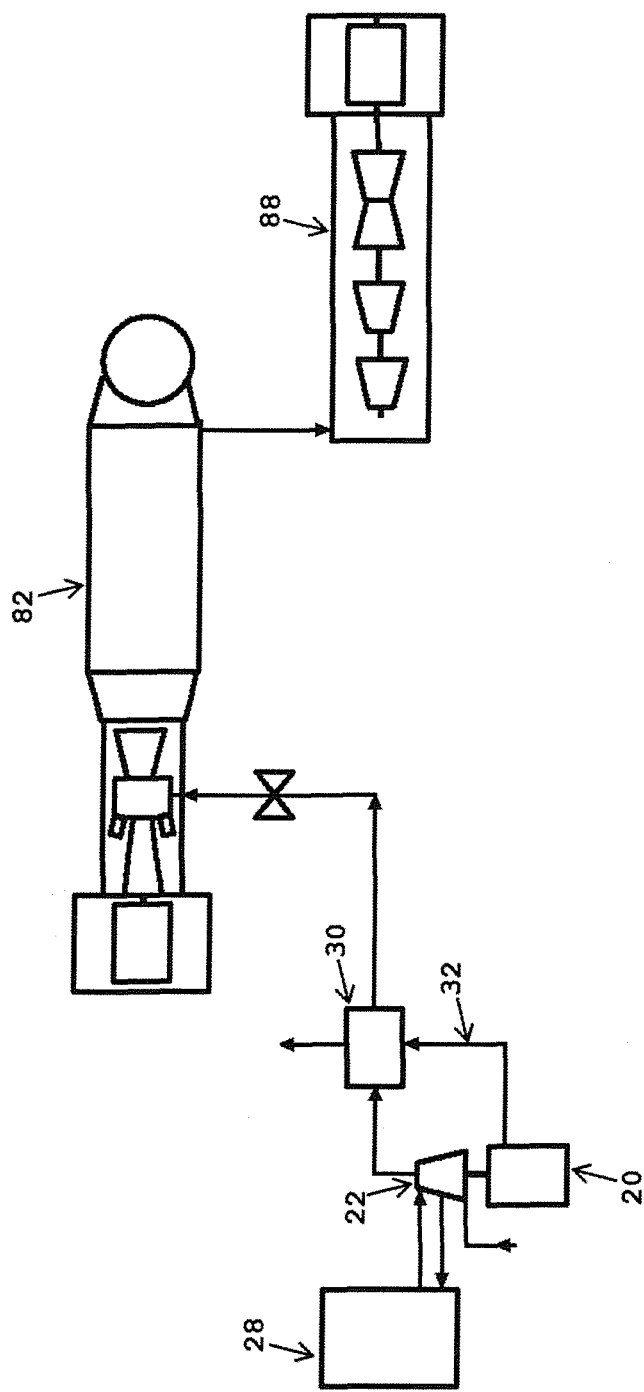
FIG. 7 is a schematic drawing of an embodiment of the present invention installed in conjunction with one gas turbine and a steam turbine.
Figure 8:
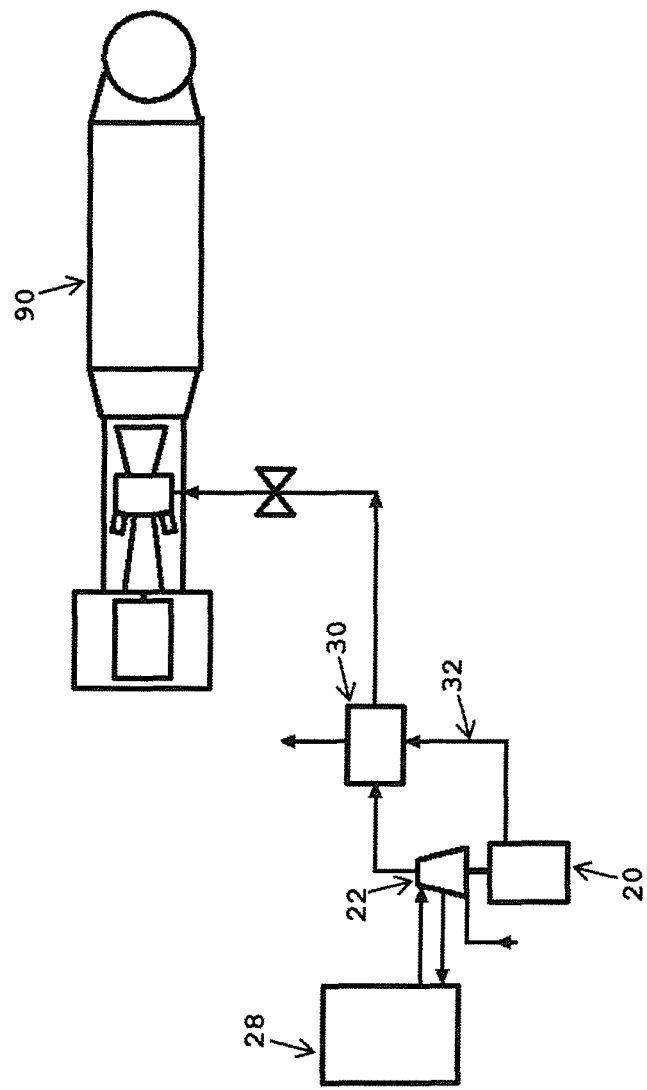
FIG. 8 is a schematic drawing of an embodiment of the present invention installed in conjunction with one gas turbine.

FIGS. 6-8 show various implementations of the embodiment shown in FIG. 1, referred to as the "TurboPHASE system". TurboPHASE, which is a supplemental power system for gas turbine systems, is a modular, packaged "turbocharger" that can be added to most, if not all, gas turbines, and can add up to 20% more output to existing simple cycle and combined cycle plants, while improving efficiency (i.e. "heat rate") by up to 7%. The TurboPHASE system is compatible with all types of inlet chilling or fogging systems, and when properly implemented, will leave emissions rates (e.g. ppm of NOx, CO, etc.) unchanged, while the specific emissions rates should improve as the result of improvement in heat rate. Since only clean air, at the appropriate temperature, is injected into the turbine, the TurboPHASE system has no negative effect on gas turbine maintenance requirements. Due to the factory-assembled & tested modules that make up the TurboPHASE system, installation at an existing power plant is quick, requiring only a few days of the gas turbine system being down for outage to complete connections and to perform commissioning.

FIG. 6 shows an implementation of the embodiment of the present invention shown in FIG. 1 in conjunction with two 135 MW General Electric Frame 9E industrial gas turbines 82, 84 in a combined cycle configuration with a 135 MW steam turbine 86 ("ST"). The results of this implementation are shown below in Table 1.

TABLE 1

| (7.0% additional Flow added to 2x1 9E combined cycle on a 59 F. day (71 lbs/sec GT)) | | |
|---|---|---|
| | Existing plant | With TurboPHASE ™ |
| Compressor Pressure ratio | 12.7 | 13.6 |
| Compressor discharge temperature | 673 F. | 760 F. |
| Compressor discharge pressure | 185 psi | 197 psi |
| Turbine firing temperature | 2035 F. | 2035 F. |
| Turbine exhaust temperature | 1000 F. | 981 F. (−19 F.) |
| 9E GT Output (MW each) | 135 MW (base load each) | +23 MW (+17% output) |
| Increased Flow | N/A | +20.7 |
| Increase PR turbine output (delta) | N/A | +5.6 |
| Increase PR compressor load (delta) | N/A | −3.3 |
| ST Output (MW) | 135 MW (base load) | +16 MW (+12%) |
| Increased Flow | N/A | +9.4 |
| Cooler Exhaust Temperature | N/A | −2.9 |
| Jacket Heat and IC Heat put into ST | N/A | +9.9 |
| 9E Plant Output SC (MW) | 135 MW (base load) | 158 MW (+23 MW or +17%) |
| 9E Plant Output CC (MW) | 405 MW (base load) | 467 MW (+62 MW or +15%) |
| Base Load Fuel Burn per GT | 1397 MMBTU/hr | 1514 MMBTU/hr |
| Fuelburn of aux engine delivering 71 lb/sec | N/A | 96 MMBTU/hr (740 Gal/hr ~15,000 hp) |
| Total additional fuelburn of GT | N/A | 11 MMBTU/hr (+1%) |
| Increase Fuel Flow | N/A | 98 MMBTU/hr (+7%) |
| Increased PR/higher CDT/mixed temp | N/A | −77 MMBTU/hr |
| Total Plant Fuelburn CC | 2974 MMBTU/hr | 3028 MMBTU/hr |
| Heatrate SC | 10350 BTU/kWh | 9582 BTU/kWh (−767 BTU/kWh or −7%) |
| Heatrate CC | 6900 BTU/kWh | 6483 BTU/kWh (−416 BTU/kWh or −6%) |

As is clear from Table 1, the implementation increased power output from each of the gas turbines by 23 MW, and increased power output from the steam turbine by 6 MW, for a total of 52 MW (2×23 MW+6 MW=52 MW). The TurboPHASE system increases air flow to the gas turbines by 7%, is operable at any ambient temperature, and yields a 4% heat rate improvement. In doing so, the pressure ratio ("PR") at the gas turbine outlet of each gas turbine increased by 5.6, while the PR of the compressor load exhibited a 3.3 decrease. The total fuel consumption rate for the combined cycle ("CC") plant increased by 54 MMBTU/hr while the heat rate for the CC plant decreased by 416 BTU kWh. For informational purposes, Table 1 also shows that if the implementation had been on a simple cycle ("SC") plant, the increased power output from each of the gas turbines by would have totaled 46 MW, while the heat rate would have decreased by 767 BTU/kWh. As an option, the intercooler heat exchanger can be eliminated and the supplemental compressor heat and engine heat added to the steam turbine cycle, which increases ST output from +6 MW to +16 MW (62 MW total) and improves heat rate by 6%.

FIG. 7 shows an implementation of the embodiment shown in FIG. 1 on a CC plant comprising one General Electric Frame 9FA industrial gas turbine 82 and one 138 MW steam turbine. In this implementation, power output by the 9FA industrial gas turbine 82 is increased by 42 MW from 260 MW, and power output by the steam turbine 88 is increased by 8 MW, for a total power output increase of 50 MW, along with a heat rate improvement of 0.25%. As an option, the intercooler heat exchanger 28 can be eliminated and the heat of compression of the supplemental compressor 22 and the heat from the exhaust 32 of the fueled engine can be added to the H SG in the steam cycle, which increases ST output from +8 MW to +14 MW (56 MW total) and improves heat rate to 1.8%.

FIG. 8 shows an implementation of the embodiment shown in FIG. 1 on a SC plant comprising one General Electric Frame 9B (or 9E) industrial gas turbine 90. In this implementation, power output by the 9B is increased by 23 MW from 135 MW, along with a heat rate improvement of 7%.

Implementation of the embodiments of the present invention preferably provide the following benefits: (i) Installation is quick and simple, with no major electric tie-in required; (ii) No change in gas turbine firing temperature, so gas turbine maintenance costs are unchanged; (iii) It uses existing ports on gas turbine system's combustion case to inject air; (iv) High efficiency, recuperated and internal combustion engine-driven inter-cooled supplemental compressor improves both SC and CC heat rates; (v) It is compatible with water injection, fogging, inlet chilling, steam injection, and duct burners; (vi) Air is injected into gas turbine combustion case at compatible temperatures and pressures; (vii) The internal combustion, reciprocating, fueled engine can burn natural gas, low BTU biofuel or diesel (also available with small steam turbine driver and small gas turbine driver for the fueled engine.); and (viii) Energy storage option also available: approximately 2 times the price and 2 times the efficiency improvement.

Figure 9:
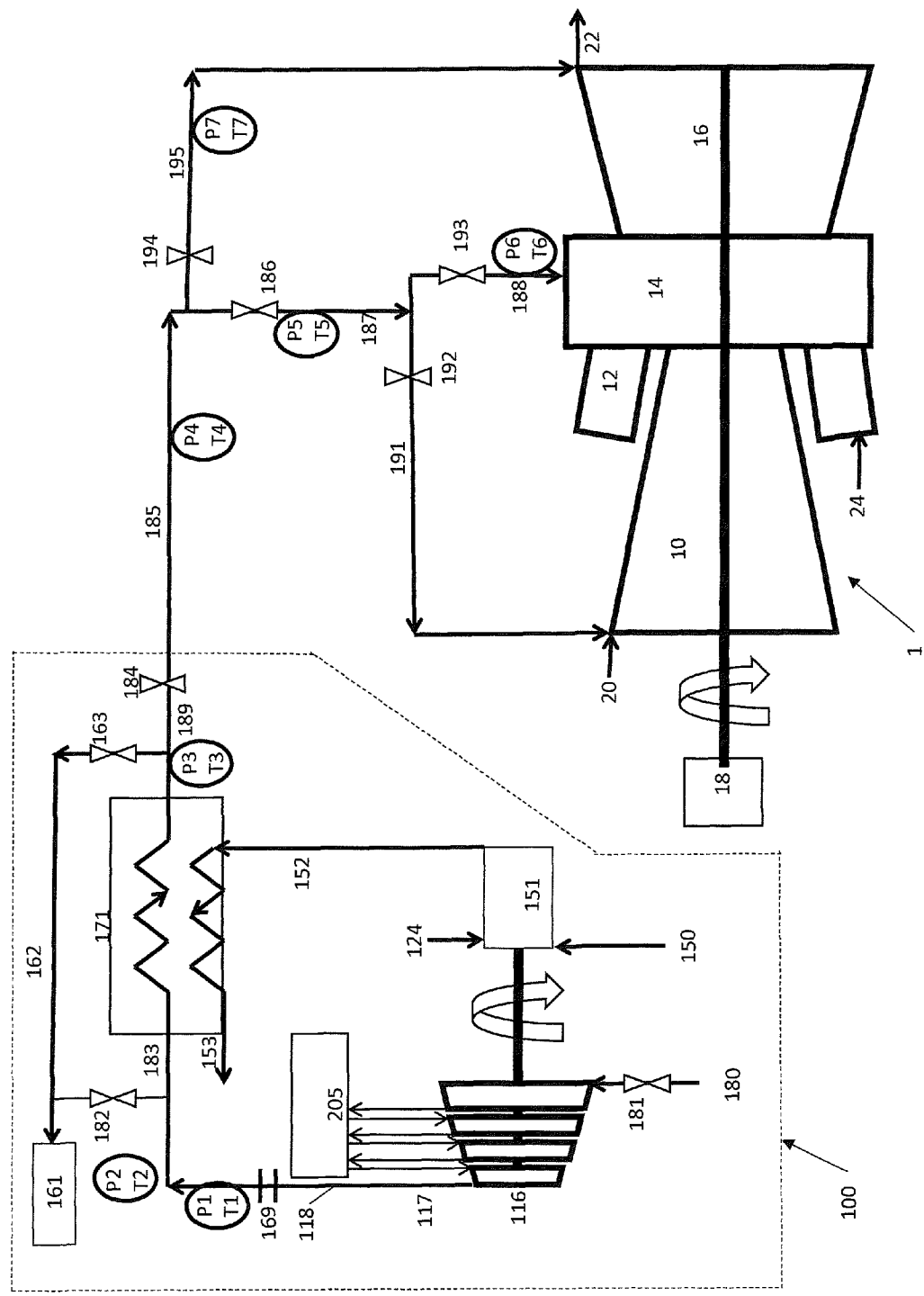
FIG. 9 is a schematic drawing of an embodiment of the present invention installed in conjunction with a single gas turbine engine.

Referring to FIG. 9, a typical gas turbine (GT) engine 1 comprises an axial compressor 10, which takes ambient air 20 and compresses the air 20 and discharges the air to a compressor discharge case (CDC) 14 at a compressor discharge pressure (CDP). Depending on the GT technology, the CDP is typically between 150 and 250 psi. The discharged air also has a compressor discharge temperature (CDT), typically between 600 F and 800 F depending on the GT technology. Fuel 24, such as natural gas, is added to the compressed air and continuously burned in one or more combustors 12 yielding elevated temperature gas, typically between 1800 F and 2600 F depending on the GT technology. This elevated gas is directed through a turbine 16 which generates about twice as much power as the compressor 10 consumes which results in a net power out to the generator 18. The gases exiting the turbine 22 are typically in the range of 800-1100 F. As one skilled in the art can appreciate, the data supplied above apply to large frame GTs. However, there are other engine types, including aero-derivative engines, that have significantly different values, yet the present invention applies to all GT's and the references made herein are for example only.

Many GTs also have what commonly known as an inlet bleed heat (IBH) system. The IBH system is used for two purposes; 1) for heating the air inlet to improve stability of the combustion process at low loads and/or cold ambient conditions and 2) to relieve the back pressure on the GT if the GT's compressor stall margin limit is reached. The IBH system typically consists of a manifold 188 that extracts air from the CDC 14 through the IBH control valve 192. Valve 193 is the IBH isolation valve and is used to isolate the IBH system so that the IBH system may be serviced while the GT 1 is running, if necessary. The pressure P6 and temperature T6 in the manifold 188 are approximately equal to the CDP and CDT of the CDC 14. Typically the IBH system also has a drain for any condensate that collects in the system. This drain consists of a valve 194 positioned between the IBH isolation valve 193 and the IBH control valve 192 that drains any liquids that collect into the GT exhaust 22 through a pipe 195. The pressure P7 and temperature T7 in this IBH drain pipe 195 are approximately the same as the gas turbine exhaust pressure, which is close to the ambient pressure so that if the IBH drain valve 194 is opened, the liquids are forced out of the system and into the GT exhaust.

The present invention also comprises a TPM 100 which comprises the components inside the dashed line of FIG. 9. In an embodiment of the present invention, the TPM 100 ties into a GT's existing IBH system through an air delivery pipe 185 and a GT isolation valve (GTIV) 186. These components allow the TPM 100 to be fluidly connected to the GT 1.

The TPM 100 utilizes a fueled engine 151 that takes in air 150 and fuel 124 and provides power to drive an intercooled compressor 116 which has an intercooler 205. The intercooled compressor 116 takes in air 180 through an inlet guide vane valve (IGVV) 181, which effectively controls the amount of air that the intercooled compressor 116 is compressing, which directly translates into power demand from the fueled engine 151. The air 117 that is compressed by the compressor 116 has an exit temperature T1 of about 250 F and a pressure P1 that ranges from zero to up to 350 psi, which is much more pressure than required to force the air to the GT 1. This air 117 flows through the compressor discharge pipe 118 and goes through a check valve 169 that prevents flow from entering the compressor from discharge pipe 118. The compressed air 117 air then can go in two directions. The compressed air 117 can be discharged through the blow off valve (BOV) 182 into pipe 162 which discharges the air to atmosphere through a silencer 161. Alternatively, the compressed air 117 can flow through a recuperator 171 via pipe 183 where it is heated by the engine exhaust 152 from the fueled engine 151. The engine exhaust 152 and compressed air 117 exchange heat in the recuperator 171 resulting in a temperature increase to the compressed air 117 to a temperature T3 and a pressure P3, which is about the same as P1, and a cooler exhaust 153. The exhaust 153 then exits the recuperator 171. The amount of exhaust 152 that actually goes through the recuperator 171 can be modulated or bypassed around the recuperator 171 to optimize the resulting temperature of the compressed air T3 depending on the use of the compressed air and the use of the exhaust gas 153 in the GT or overall combined cycle plant system. The air exits the recuperator 171 through a pipe 189 with its temperature T3 being greater than T1.

The vent valve (VV) 163 provides another path for the hot pressurized air to be discharged to atmosphere through pipe 162 into a silencer 161. When the TPM 100 is delivering the hot pressurized air to the GT 1 through pipe 185 at a pressure P4 and temperature T4, the injection control valve (ICV)

184 is fully open so that there is a minimal pressure drop and P3 is about the same pressure as P4. The piping and valve structure described above allows the TPM 100 to preheat and warm up the air pipes involved with injecting the compressed air, start the TPM 100 and develop full pressure and temperature in the TPM 100, smoothly ramp the air flow into the GT 1, smoothly ramp the air flow out of the GT 1 and turn off the GT 1, all independent of the GT 1 operation.

Figure 10:
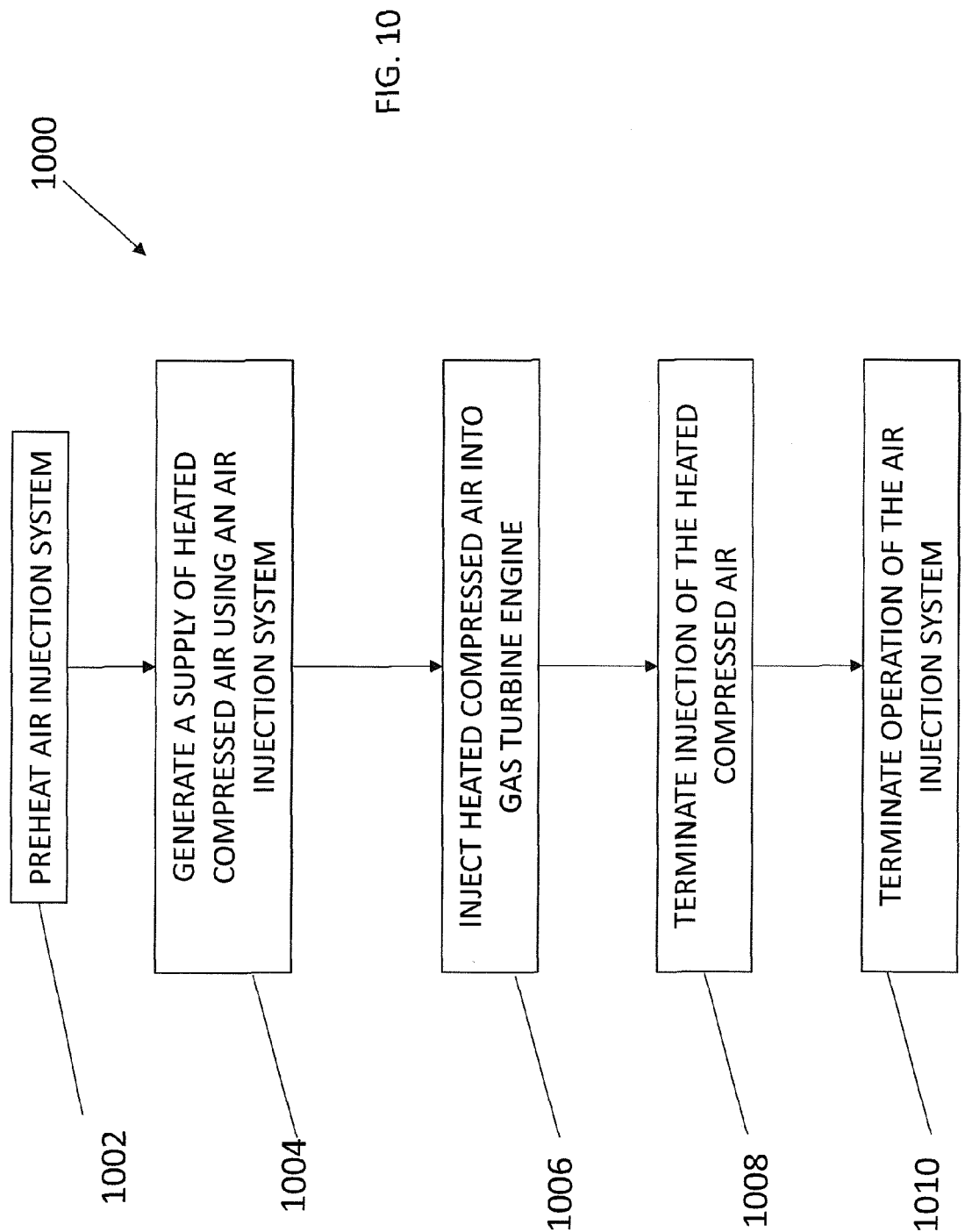
FIG. 10 is a flow diagram depicting a method of operating an embodiment of the present invention.

Referring now to FIG. 10, an embodiment of the present invention depicts a method 1000 of operating an air injection system for providing power augmentation to a gas turbine engine. The method 1000 includes a step 1002 of preheating the air injection system (TPM), as will be discussed further herein. Once the air injection system is preheated, then in a step 1004, a fueled engine, intercooled compressor and intercooler of the air injection system are operated to generate a supply of compressed air. Exhaust from the fueled engine is directed through a recuperator where it interacts thermally with the compressed air from the intercooled compressor, thereby generating a supply of heated compressed air. In a step 1006, the heated compressed air is injected into the gas turbine engine for a predetermined period of time in order to increase the work output of the gas turbine engine, as discussed above. Then, in a step 1008, the injection of heated compressed air to the engine is terminated and in a step 1010, operation of the air injection system is also terminated.

As one skilled in the art understands, operation of a gas turbine engine and power plant is a complex process requiring numerous procedures to occur and monitoring numerous conditions, inputs, and outputs from a number of sources, such as temperatures, pressures, fuel flow rates, load demand, engine speed, output, generator output, etc. Accordingly, modern day gas turbine engines are typically controlled with a computer or other control-type device having numerous control algorithms. One such controller common to industrial gas turbines is the Mk V or VI controller offered by General Electric Company. Therefore, such a control system is also envisioned for application by the present invention. For example, the air injection system may be controlled by a programmable logic controller that operates separately from the controller that operates the gas turbine engine. Alternatively, operation of the air injection system may be controlled by a programmable logic controller that is in communication with, and therefore works in conjunction with, a main control system of the gas turbine engine.

The present invention pertains to a series of methods for operating an air injection system for providing power augmentation to one or more gas turbine engines at a power plant. As one skilled in the art will appreciate, embodiments of the present invention may be embodied as, among other things, a method, a system, or a computer-program product. Accordingly, the embodiments may take the form of a hardware embodiment, a software embodiment, or an embodiment combining software and hardware. Furthermore, embodiments of the present invention take the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVDs), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

One aspect of the present invention is directed to one or more computer-readable media that, when invoked by computer-executable instructions, perform a method for controlling an air injection system for power augmentation of a gas turbine engine. The method comprises the steps of preheating the air injection system, as discussed herein, and operating a fueled engine, intercooled compressor and intercooler of the air injection system to generate compressed air. The cool compressed air is directed through a recuperator where it interacts thermally with exhaust from the fueled engine to heat the compressed air. The computer-executable instructions also control injecting the heated compressed air into the gas turbine engine for a predetermined time period. Thereafter, the computer-executable instructions terminate injection of the heated compressed air into the gas turbine engine, and subsequently terminate operation of the air injection system. As discussed above for other embodiments of the present invention, the computer-executable instructions may be performed independent of a control system for the gas turbine engine. Alternatively, the computer-executable instructions may be performed in conjunction with the control system for the gas turbine engine.

The present invention also provides apparatus and methods for warming, or preheating, a piping portion of the air injection system. Warming the piping portion of the air injection system is a critical feature of the air injection system in order to move quickly from a "zero flow" condition to a "full flow" condition because of thermal shock on the piping and GT system, as well as the desire to deliver hot compressed air to the GT the moment air injection starts. Most prior art injection systems utilize steam injection which can take about 30 minutes before steam injection capability is available. The present invention will provide air injection in 5 to 10 minutes and can be readied ahead of actually injecting air into the GT.

This warming or preheating can occur by directing heated compressed air from a compressor discharge of the gas turbine engine through the piping of the air injection system. Alternatively, the air injection system can be preheated by closing all of the valves permitting fluid communication with the compressor discharge region of the gas turbine engine and operating the air injection system such that all air flow is directed through the piping of the air injection system and through, for example, an inlet bleed heat drain valve 194 and into an exhaust region 22 of the GT 1.

The present invention provides for two different warm-up modes for the air injection system, one where the air flows from the GT 1 to the TPM 100 and one where the air flows from the TPM 100 to the GT 1. When the GT 1 is operating and the TPM 100 is not operational, typically IBH control valves 192, IBH isolation valve 193, GT isolation valve 186 and IBH drain valve 194 are closed so there is no flow in the IBH system or the air injection piping of the TPM 100. To heat up the pipes using air from the GT CDC 14, the GTIC 186, ICV 184, and VV 163 and/or BOV 182 are opened to allow some air flow from the GT 1, which is at CDC pressure and temperature P6 and T6, to flow through the air injection system and discharge to the atmosphere through the silencer 161. This allows the air pipes to be preheated with the TPM off.

Figure 11:
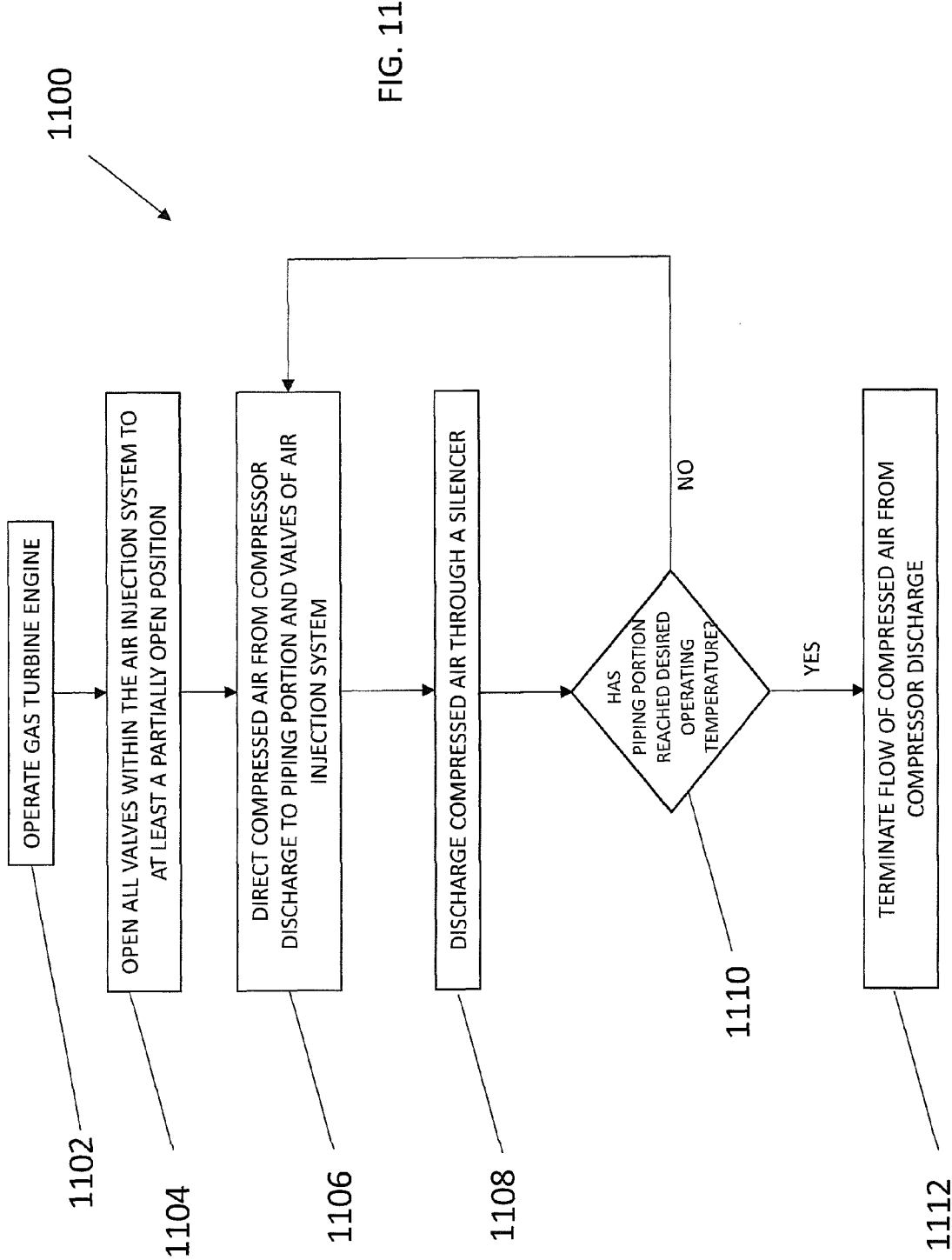
FIG. 11 is a flow diagram depicting a method of preheating an air injection system in accordance with an embodiment of the present invention.

More specifically and with reference to FIG. 11, a method 1100 of preheating an air injection system for a gas turbine engine is disclosed. In the method 1100, the gas turbine engine is operating at a step 1102. Then, in a step 1104, the valves within the air injection system are opened to at least a partially opened position. The valves can be opened to any position desired to provide the required amount of heated compressed air from the gas turbine engine to the air injection system. In a step 1106, a flow of compressed air from the compressor discharge region of the gas turbine engine is directed to flow through a piping portion and valves of the air injection system. Then, in a step 1108, the flow of compressed air which heated the piping portion and valves is discharged to the atmosphere through a silencer. In a step 1110, a determination is made as to whether the piping portion of the air injection system has reached a predetermined desired operating temperature. If the piping portion has not achieved the desired operating temperature, the process continues to operate by way of continuing to inject compressor discharge air into the air injection system and discharge the air through the silencer, as discussed in steps 1106 and 1108. However, once a determination has been made that the piping portion of the air injection system has achieved the desired operating temperature, the flow of compressed air from the compressor discharge of the gas turbine engine is terminated in a step 1112. The air injection system piping is now at proper temperature to inject heated compressed air into the GT without creating the thermal shock discussed above.

The method of preheating an air injection system as discussed above, may be implemented in a variety of manners. Such a method can be implemented manually or through an automated means such as through a computing device using one or more processors using computer-executable instructions.

The second way of warming up the air injection system can occur with the GT 1 on or off and by starting the TPM 100 and delivering hot air through the ICV 184 towards the GT 1 and opening an access valve, such as the IBH drain valve 194. As discussed herein, accessing the GT engine through the CDC 14 and the inlet bleed heat system is but one manner envisioned for preheating the piping portions of the air injection system. As such, the present invention is not limited to this structure.

Independent of whether the GT 1 operational, there will be no pressure or flow in the air injection pipe 185 from the GT 1 because the valves 186, 192, and 193 are closed. Therefore, when the IBH drain valve 194 is open, air flows from the TPM 100 through all the air injection piping and discharges in the exhaust of the GT 1. This allows the operator the flexibility to prepare to inject air from the air injection system into the GT 1, regardless of the GT operational status, and independent of the TPM 100 status, eliminating what is typically a slow preheat injection warm up cycle.

Figure 12:
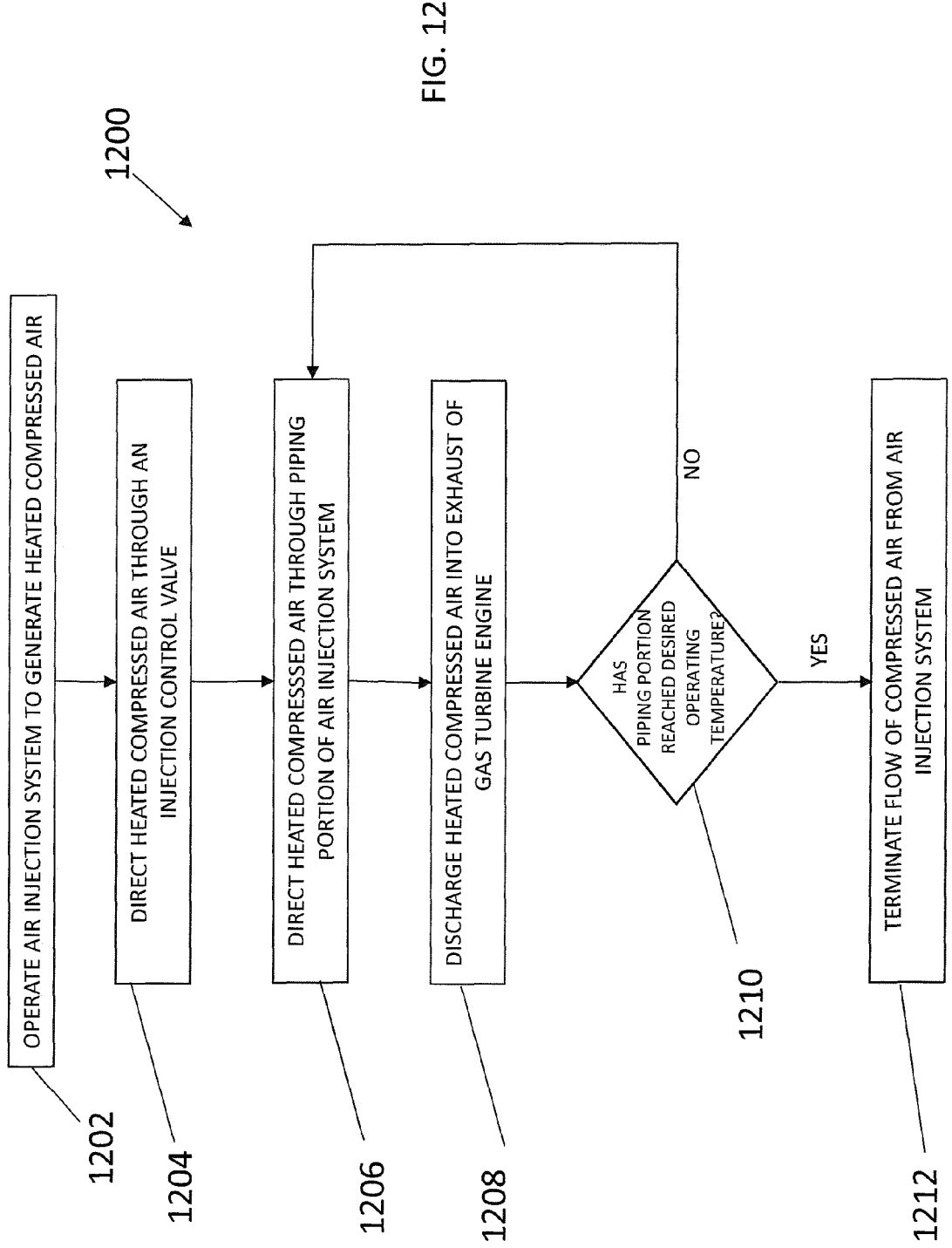
FIG. 12 is a flow diagram depicting an alternate method of preheating an air injection system in accordance with an embodiment of the present invention.

Referring now to FIG. 12, an alternate method of preheating a piping portion of an air injection system for a gas turbine engine is disclosed. In the method 1200 of preheating the piping portion, the air injection system operates to generate a source of heated compressed air in a step 1202. In a step 1204, the heated compressed air is directed through an injection control valve. Depending on the orientation by which the piping portion of the air injection system is being preheated, if the piping portion is preheated via an inlet bleed heat system, the method 1200 may also include the step of opening a drain valve of the inlet bleed heat system. Thereafter, in a step 1206, the heated compressed air is directed through the piping portion of the air injection system. Then, in a step 1208, the heated compressed air is discharged into the exhaust of the gas turbine engine. As the piping portion is preheated by the air injection system, a determination is made in a step 1210 whether the piping portion has reached a desired operating temperature. If the piping portion has not reached its desired operating temperature, then the process of steps 1206 and 1208 continue such that heated compressed air is passed through the piping portion to continue warming the piping portion. If, in step 1210, the piping portion has reached its desired operating temperature, then in a step 1212, the flow of compressed air from the air injection system through the piping portion is terminated.

In order to start the TPM 100, the compressor IGV's 181 are closed so that as the compressor 116 and fueled engine 151 comes up to the correct speed, such that the minimum flow, and therefore, power is developed. Additionally, during this time, the BOV 182 is open and the VV 163 and ICV 184 are closed. This allows what small flow is generated during start up to bypass the recuperator 171, allowing the recuperator 171 to start-up quickly. For extended start up or part load operation with the ICV 184 closed, and no air injection to the gas turbine, the BOV 182 can be partially or fully closed and the VV 163 can be adjusted to develop any pressure desired, up to the capability of the auxiliary compressor 116, which also allows to simulate full flow temperature and pressure (T3 and P3) prior to injecting any air into the GT 1 because the ICV 184 is closed. This not only allows for an accelerated heating of the TPM 100, but also allows the air injection system to demonstrate full pressure and temperature prior to each injection which increases the reliability of the system. Another advantage of this valve structure is that in the preheating cycle disclosed in FIG. 12 generates hotter compressed air than can be delivered to the air injection piping 185 via other processes. A much hotter air temperature T3 can be developed with the VV 163 closed and the BOV 182 open and the TPM 100 at full or partial flow, where the majority of air being generated by the auxiliary compressor 116 is going through the BOV 182 and only a small amount of the air is going through the recuperator 171. However, the exhaust 152 of the fueled engine 151 is at full or partial operating temperature. By having only a small amount of air flow through the recuperator 171 and full exhaust flow, the resulting air temperature is much higher than when the air circuit in the recuperator 171 sees full injection flow and is approaching the exhaust temperature. By increasing this temperature, the air injection piping can be heated at a quicker rate and to a higher temperature, greater than what it will see during normal flow levels, thus speeding up the air injection process.

Figure 13:
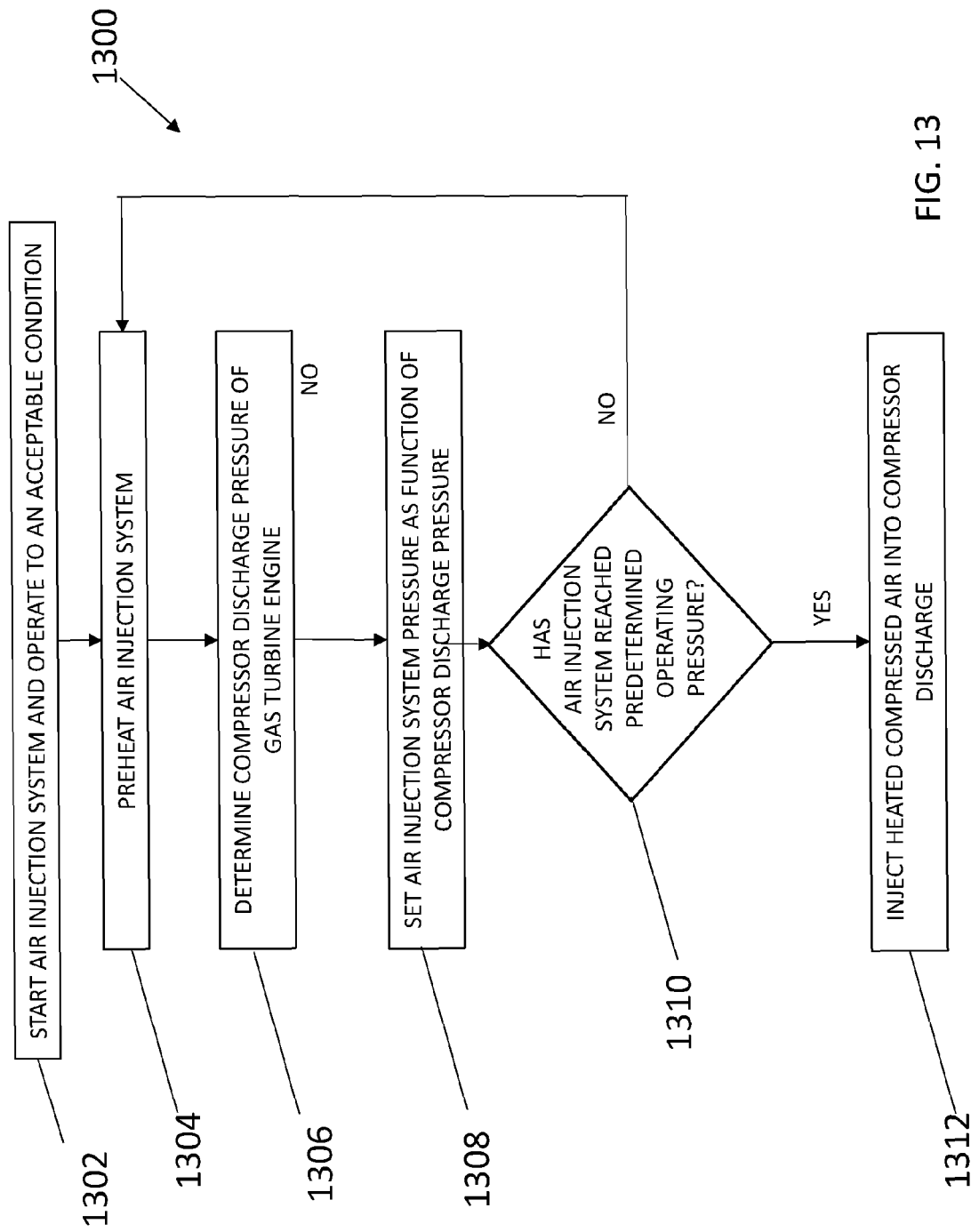
FIG. 13 is a flow diagram depicting a method of operating an air injection system in accordance with an embodiment of the present invention.

Referring now to FIG. 13, a method 1300 of operating an air injection system for augmenting power to a gas turbine engine is disclosed. The method 1300 comprises a step 1302 of starting the air injection system and bringing the air injection system to an acceptable operating condition, such as a predetermined pressure and/or temperature. Then, in a step 1304, the air injection system is preheated. In a step 1306, a compressor discharge pressure for the gas turbine engine is determined. Once the compressor discharge pressure of the gas turbine engine is determined, a desired pressure for the air injection system is set in a step 1308, where the pressure of the air injection system is a function of the compressor discharge pressure. In a step 1310, a determination is made as to whether the air injection system has reached the set pressure in step 1308. If the air injection system has not reached the desired predetermined pressure, the process of steps 1304, 1306, and 1308 continue until the predetermined pressure is achieved. Once a determination is made in step 1310 that the air injection system has reached the predetermined operating pressure, then the process continues to a step 1312 where the heated air from the air injection system is supplied to the compressor discharge in order to augment the power output of the gas turbine engine.

In an alternate embodiment of the present invention, the injection of the heated compressed air occurs by opening an isolation valve in communication with the gas turbine engine, opening an injection control valve of the air injection system, and closing a vent valve in the air injection system. As a result, the heated compressed air is forced through to the gas turbine engine.

Figure 14:
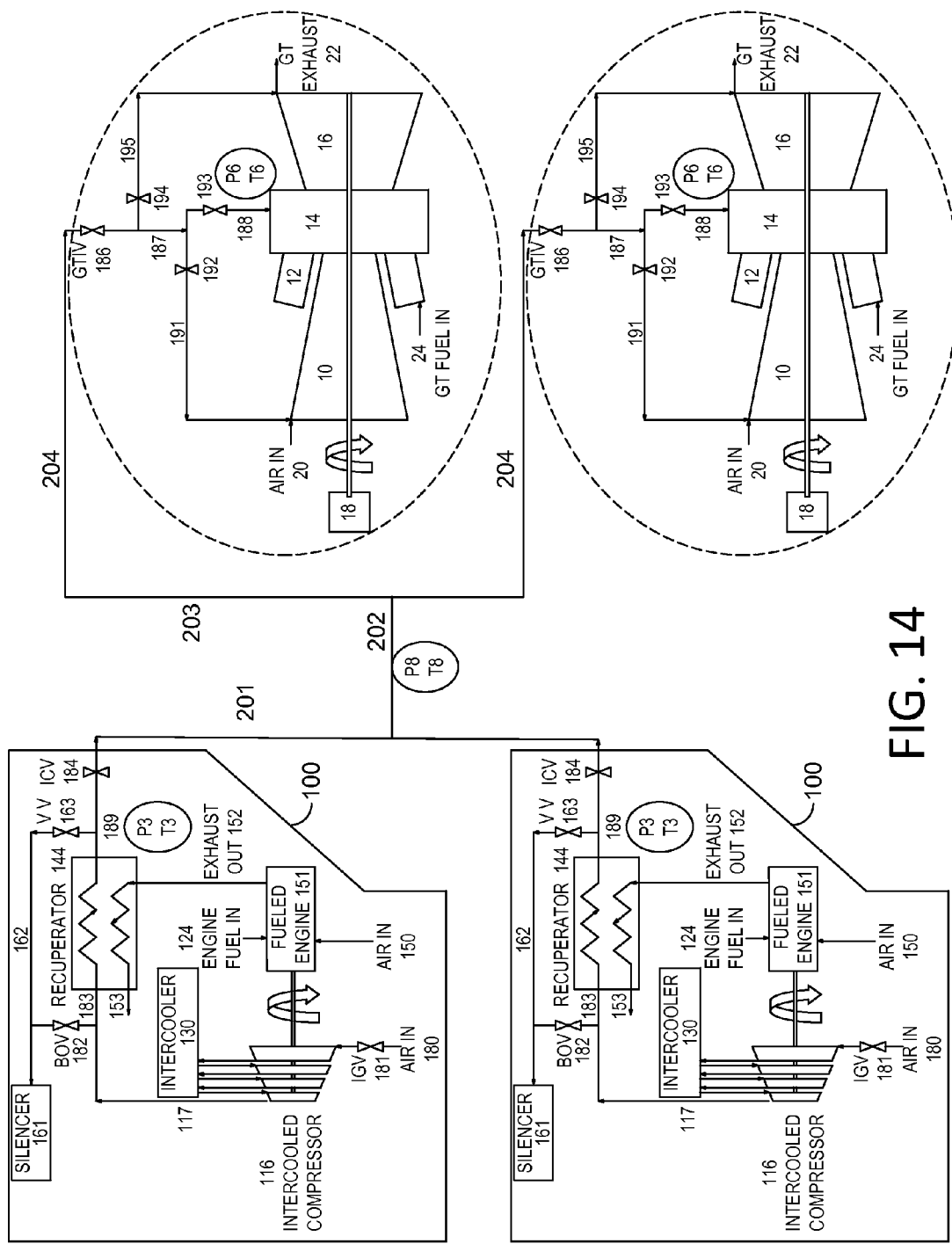
FIG. 14 is a schematic drawing of an embodiment of the present invention installed in conjunction with multiple gas turbine engines.
Figure 15:
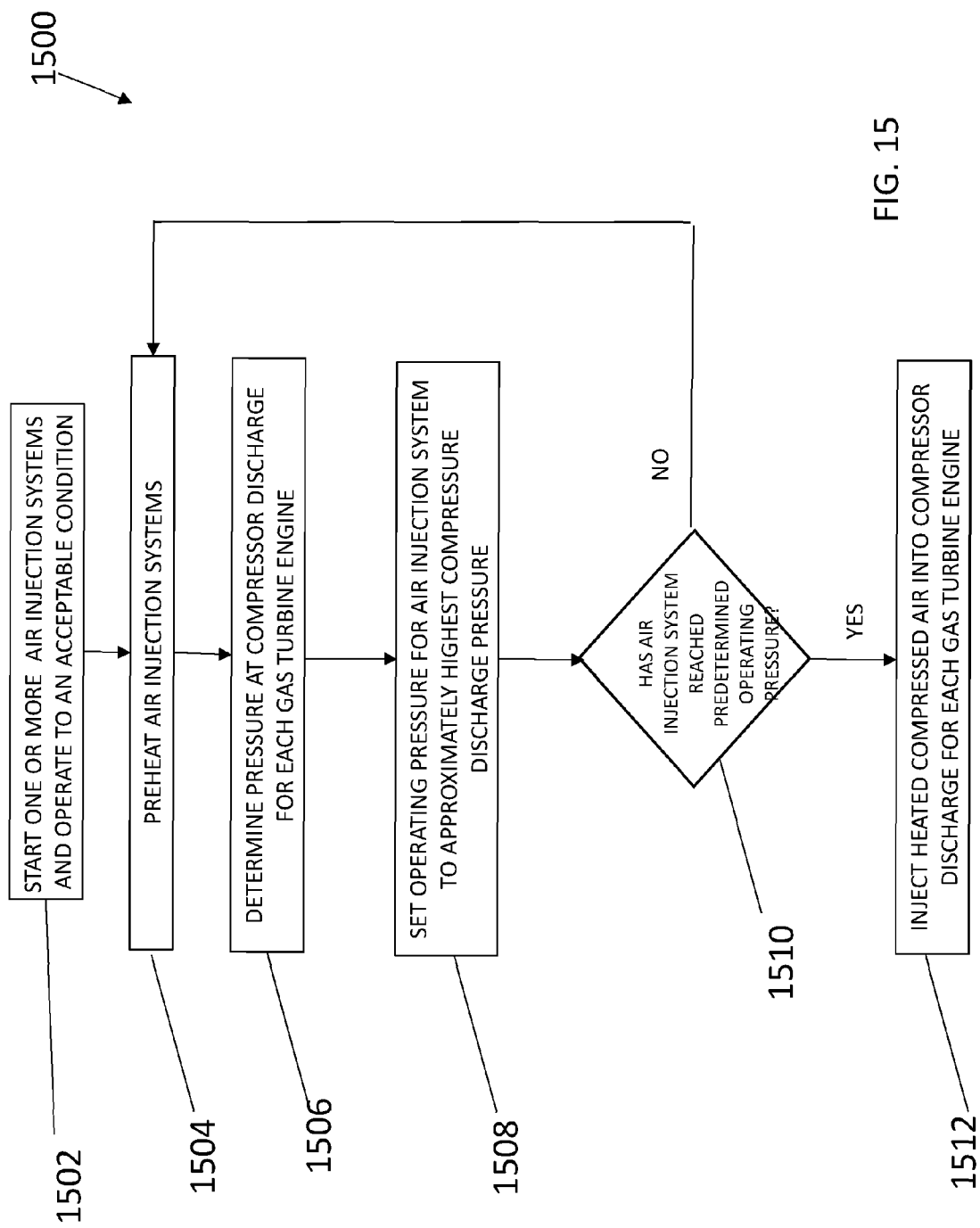
FIG. 15 is a flow diagram depicting a method of operation for the embodiment of the present invention in FIG. 14.

Yet another alternate embodiment of the present invention is disclosed in FIGS. 14 and 15. First referring to FIG. 14, and as one skilled in the art can appreciate, when more than one TPM 100 is supplying heated compressed air to a manifold 201, where the manifold 201 supplies one or more GTs 1, it is necessary to be able to preheat each TPM 100 to a specific pressure and temperature independent of each other, as not all TPM's may be required at all times. Additionally, as injection increases to the GT 1, the GT's CDC pressure P6 increases, such that the set point for the second compressor to start injecting into the manifold 201 will be higher than when the first TPM 100 was started.

After the TPM 100 is at full speed and preheated to operating conditions, which can take 30 seconds or longer, and the air injection lines are preheated as described above, the BOV 182 is closed, and the compressed air in the air injection pipe 189 is at a pressure approximately equal to the gas turbine CDC pressure (P3 about equal to P6), and the temperature of the air about to be injected is at a sufficient temperature T3 as determined by the application and injection location, then the air injection can be ramped up to the GT. As one skilled in the art understands, it is not necessary to have all these conditions satisfied if a conventional injection process was implemented, however, all of these steps increase the speed that the air and therefore, incremental power can be added to the power plant. To ramp the injection of hot compressed air into the GT, the air pressure P3 in pipe 189 is verified to be approximately equal to P6 and then the GTIV 186 can be partially or fully opened, the ICV 184 can be partially or fully opened, and then the VV 163 is closed, forcing all of the air through the air injection pipe 189. It is critical to have the pressure P3 in the air injection pipe 189 approximately equal to the GT CDC pressure P6, otherwise the air injection piping 202 acts as a large air storage tank and either suddenly draws down if the pipe pressure is lower, or over-injects air if the air pressure is higher in the pipe 185 when the GTIV is opened the first time. In the case where the air injection pipe 202 is injecting into multiple gas turbines as shown in FIG. 14, and the CDC pressure P6 in each GT is at different pressures because of engine to engine variation or part load operation, then the pressure P8 in the air delivery pipe 202 is set to the highest pressure P6 of any of the gas turbines manifolded together with pipes 203 and 204. Additionally, the GTIV 186 on the GTs that have lower P6 pressures will be adjusted closed accordingly to develop the appropriate pressure drop across the valve so that the flow to the gas turbines are the same. Other settings are possible for the GTIV 186 that will increase or decrease the flow to individual GT based on the desired output.

Referring now to FIG. 15, a method 1500 of operating one or more air injection systems for augmenting power to a plurality of gas turbine engines is disclosed. The method 1500 provides a step 1502 where one or more air injection systems are started and bringing the air injection systems to an acceptable operating condition. In a step 1504, the air injection systems are preheated. Then, in a step 1506, a compressor discharge pressure for each of the gas turbines is determined. Once each of the compressor discharge pressures are determined, a pressure for the air injection system is set in a step 1508 as a function of the gas turbine having the highest compressor discharge pressure. Then, in a step 1510, a determination is made as to whether the air injection system has reached the set pressure of step 1508. If the determination is made that the air injection system is not at the desired operating pressure, then the process continues so as to keep heating the air injection system through steps 1504, 1506, and 1508. Upon determination of the air injection system reaching the predetermined operating pressure, the heated compressed air is then injected into the compressor discharge of each of the gas turbine engines in a step 1512. The method 1500 can further comprise the step of adjusting an isolation valve on the gas turbine engine having a lower compressor discharge pressure in order to develop an appropriate pressure drop across the isolation valve so as to result in generally uniform flow of heated compressed air to the plurality of gas turbine engines. As with the other embodiments discussed herein, the method 1500 can be accomplished using a controller having one or more processors using computer-executable instructions.

While the invention has been described in what is known as presently the preferred embodiment, it is to be understood that the invention is not to be limited to the disclosed embodiment but, on the contrary, is intended to cover various modifications and equivalent arrangements within the scope of the following claims. The present invention has been described in relation to particular embodiments, which are intended in all respects to be illustrative rather than restrictive.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

The invention claimed is:

1. A method of operating an air injection system for augmenting power to a gas turbine engine, where the air injection system comprises a compressor, a vent valve, and an injection control valve, the method comprising:
   starting the air injection system, where inlet guide vanes of the compressor are in a substantially closed position, the vent valve is open and the injection control valve is closed, and bringing the air injection system to a predetermined temperature or pressure;
   determining a compressor discharge pressure for the gas turbine engine;
   setting a pressure for the air injection system as a function of the compressor discharge pressure;
   determining the air injection system has reached the predetermined temperature or pressure; and,
   injecting a heated compressed air from the air injection system into the gas turbine engine.

2. The method of claim 1, wherein injecting the heated compressed air occurs by opening an isolation valve in communication with the gas turbine engine, opening the injection control valve of the air injection system, and closing the vent valve in the air injection system, thereby forcing heated compressed air through to the gas turbine engine.

3. The method of claim 1, wherein the method is controlled using one or more processors using computer-executable instructions.

4. The method of claim 1, wherein the heated compressed air is injected into the compressor discharge region of the gas turbine engine.

5. The method of claim 1 further comprising the step of preheating the air injection system prior to determining the compressor discharge pressure.

6. The method of claim 5, wherein the preheating of the air injection system may be concentrated on a portion of the air injection system.

7. The method of claim 5, wherein the preheating of the air injection system occurs by directing heated compressed air from the gas turbine engine through piping of the air injection system.

8. The method of claim 5, wherein the preheating of the air injection system occurs by closing all valves permitting fluid communication with a compressor discharge of the gas turbine engine, operating the air injection system, and directing flow from the air injection system through a valve and into an exhaust region of the gas turbine engine.

9. A method of operating an air injection system for augmenting power to a gas turbine engine, where the air injection system comprises a compressor, a vent valve, and an injection control valve, the method comprising:
   starting the air injection system, where inlet guide vanes of the compressor are in a substantially closed position, the vent valve is open and the injection control valve is closed;
   bringing the air injection system to a predetermined temperature or pressure;
   preheating the air injection system;
   determining the air injection system has reached the predetermined operating temperature; and,
   injecting a heated compressed air from the air injection system into the gas turbine engine.

10. The method of claim 9, wherein the preheating of the air injection system occurs by directing heated compressed air from the gas turbine engine through piping of the air injection system.

11. The method of claim 9, wherein the preheating of the air injection system occurs by closing all valves permitting fluid communication with a compressor discharge of the gas turbine engine, operating the air injection system, and directing flow from the air injection system through a valve and into an exhaust region of the gas turbine engine.

12. A method of operating an air injection system for augmenting power to a gas turbine engine, where the air injection system comprises a compressor, a vent valve, and an injection control valve, the method comprising:
   starting the air injection system, where inlet guide vanes of the compressor are in a substantially closed position, the vent valve is open and the injection control valve is closed, and bringing the air injection system to a predetermined temperature or pressure;
   preheating the air injection system;
   determining a compressor discharge pressure for the gas turbine engine;
   setting a pressure for the air injection system as a function of the compressor discharge pressure;
   determining the air injection system has reached the set pressure; and,
   injecting a heated compressed air from the air injection system into the compressor discharge region of the gas turbine engine.

13. The method of claim 12, wherein the preheating of the air injection system occurs by directing heated compressed air from a compressor discharge of the gas turbine engine through piping of the air injection system.

14. The method of claim 12, wherein the preheating of the air injection system occurs by closing all valves permitting fluid communication with a compressor discharge of the gas turbine engine, operating the air injection system, and directing flow from the air injection system through an inlet bleed heat drain valve and into an exhaust region of the gas turbine engine.

15. The method of claim 12, wherein injecting the heated compressed air occurs by opening an isolation valve in communication with the gas turbine engine, opening the injection control valve of the air injection system, and closing the vent valve in the air injection system, thereby forcing all of the heated compressed air through to the gas turbine engine.

16. The method of claim 12, wherein the method is controlled using one or more processors using computer-executable instructions.

* * * * *